United States Patent [19]

Iwashita

[11] Patent Number: 5,211,420
[45] Date of Patent: May 18, 1993

[54] ADJUSTABLE HEIGHT SUSPENSION MECHANISM FOR TWO-WHEELED MOTOR VEHICLES

[75] Inventor: Kanau Iwashita, Saitama, Japan

[73] Assignee: Honda Giken Kogyo Kabushiki Kaisha, Tokyo, Japan

[21] Appl. No.: 782,904

[22] Filed: Oct. 24, 1991

Related U.S. Application Data

[63] Continuation of Ser. No. 408,044, Sep. 15, 1989, abandoned.

[30] Foreign Application Priority Data

Sep. 16, 1988 [JP] Japan .................................. 63-231655

[51] Int. Cl.$^5$ ...................... B60G 17/01; B60G 17/015
[52] U.S. Cl. ..................................... 280/703; 280/707; 180/219
[58] Field of Search ................ 280/707, 703, 840, 612, 280/702; 364/424.05

[56] References Cited

U.S. PATENT DOCUMENTS

| | | | |
|---|---|---|---|
| 4,212,484 | 7/1980 | Fujii | 280/707 |
| 4,568,101 | 2/1986 | Bleustein | 280/707 |
| 4,586,728 | 5/1986 | Tokunaga et al. | 280/703 |
| 4,687,223 | 8/1987 | Miyoshi | 280/707 |
| 4,691,284 | 9/1987 | Izumi et al. | 280/703 |
| 4,714,271 | 12/1987 | Buma et al. | 280/707 |
| 4,715,616 | 12/1987 | Asami et al. | 280/707 |
| 4,741,554 | 5/1988 | Okamoto | 280/703 |

*Primary Examiner*—Karin L. Tyson
*Attorney, Agent, or Firm*—Lyon & Lyon

[57] ABSTRACT

A suspension system for two-wheeled vehicles capable of adjusting effective height of the vehicle and the spring rate of the suspension. Damping adjustment mechanisms are also employed. In the front suspension of a two-wheeled vehicle, a left-right suspension mechanism is employed with one component of the suspension having a variable seat driven by hydraulic pressure. The other component includes two springs in series with a seat therebetween. A hydraulic cylinder may be actuated to effectively reduce or eliminate the operation of one of the springs to change the spring rate of the system by moving and retaining the seat toward one of the springs. Actuator motors control damping resistance through adjustable damping orifices defined by needle valves and associated seats. A unitary damping and suspension spring mechanism associated with the rear suspension provides a hydraulic cylinder in association with a seat for the suspension spring to vary the height of the vehicle. The cylinder is associated with the damping mechanism concentrically mounted inwardly of the suspension spring and a rubber suspension spring. The adjustable spring seat is positioned about the damping mechanism and mounted thereto through the adjustment mechanism. A further movable seat may be used to control the spring constant of the coil spring and rubber spring suspension mechanism.

11 Claims, 18 Drawing Sheets

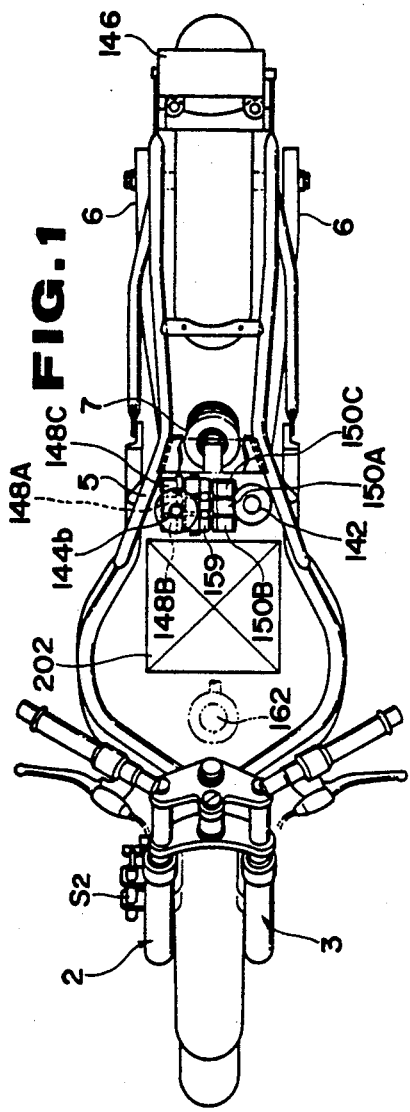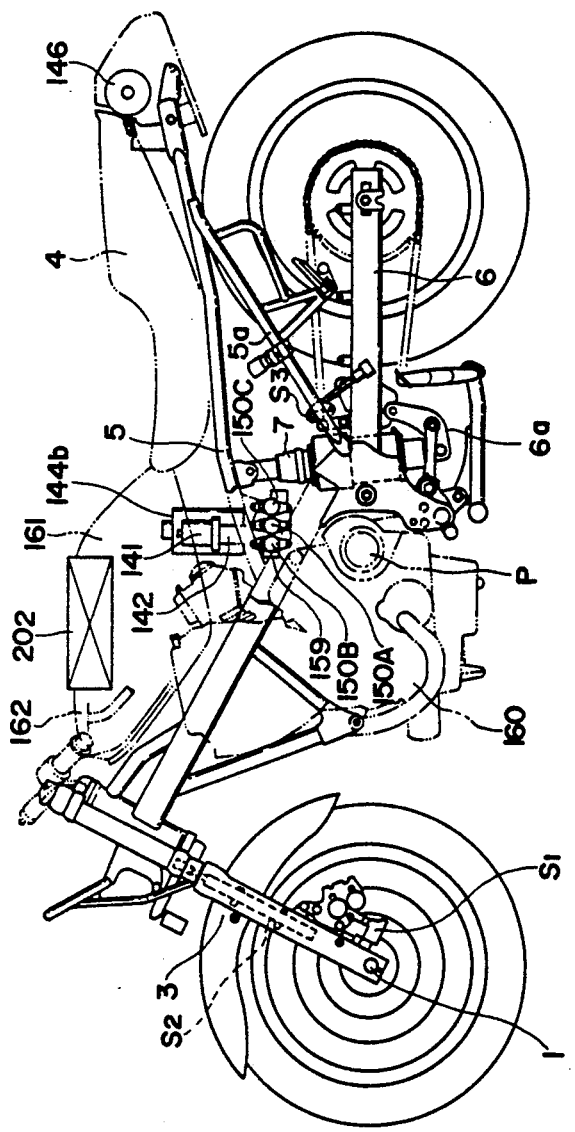

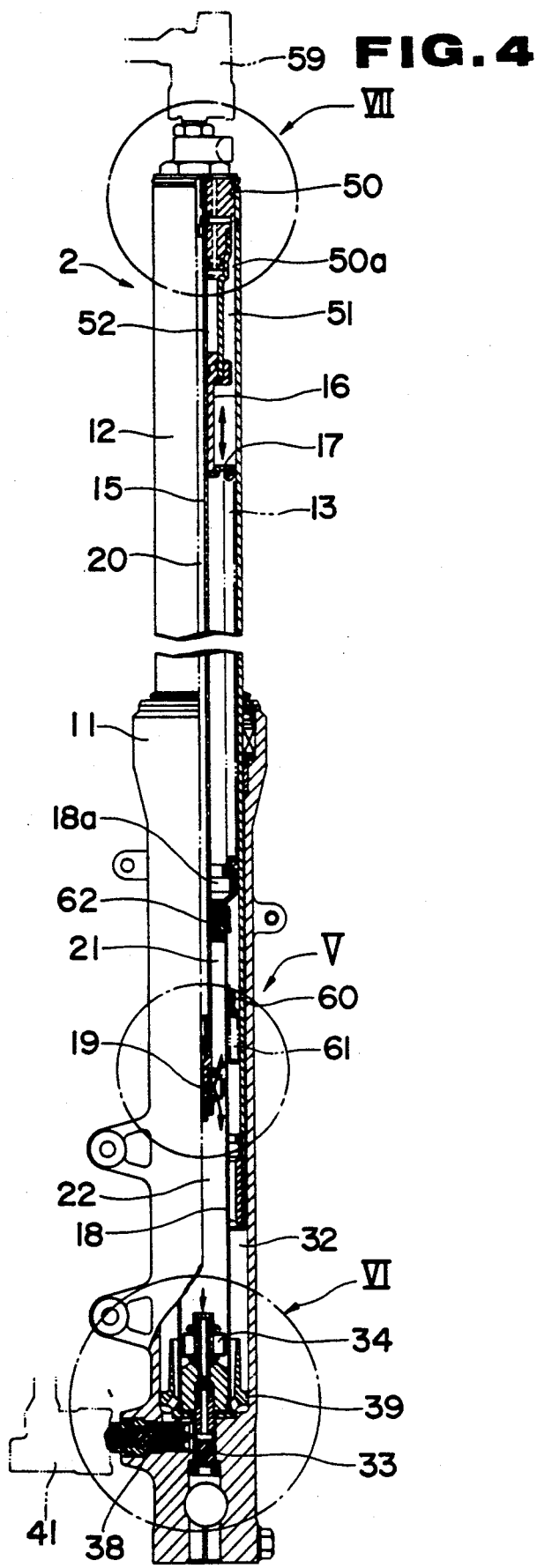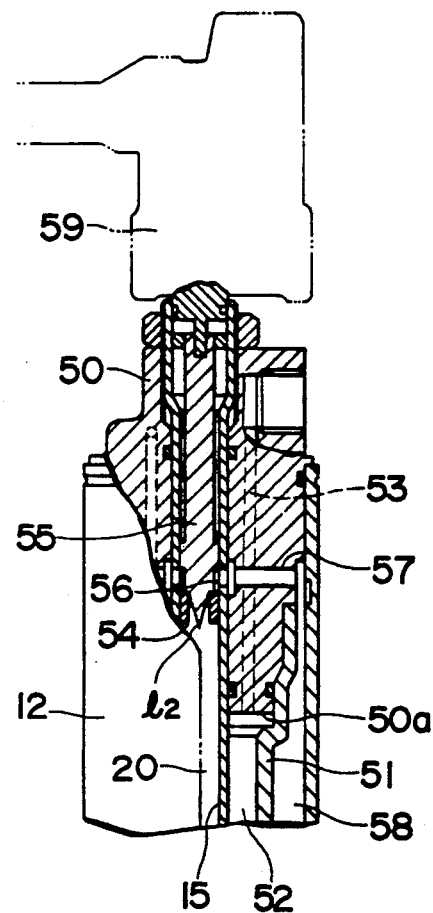

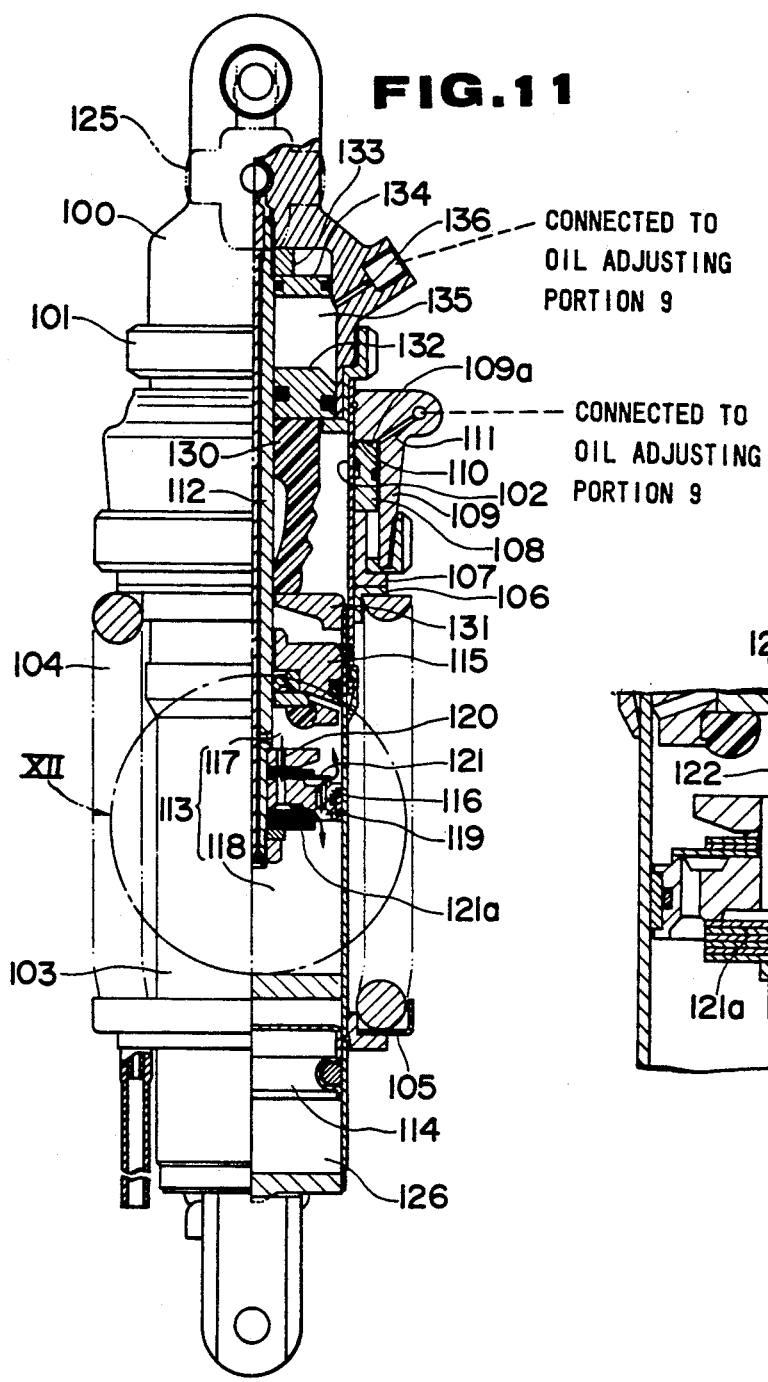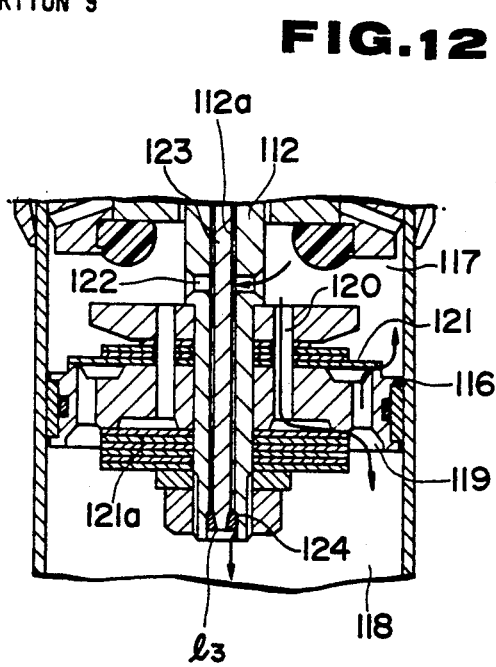

| | OBJECT OF CONTROL | CONTROL ACTION | OPERATING CONDITIONS | SENSOR |
|---|---|---|---|---|
| MOTOR CONTROL | RIDING SENSATION | SOFT MEDIUM HARD 3 MODE SELECTION <table><tr><td></td><td>DANPING FORCE</td><td>SPING CONSTANT</td></tr><tr><td>SOFT</td><td>S</td><td>S</td></tr><tr><td>MEDIUM</td><td>H</td><td>S</td></tr><tr><td>HARD</td><td>H</td><td>H</td></tr></table> | MANUAL SELECTION | |
| VEHICLE HEIGHT CONTROL | IMPROVEMENT OF LEG POSITION AT VERY LOW OPERATING SPEED | MAINTAINING LOW VEHICLE POSITION AT STOP AND AT VERY LOW SPEED | VEHICLE LOWERING AT 0 km/h<br><br>START OF REGULATION AT 15 km/h FOR STANDARD VEHICLE HEIGHT | * VEHICLE SPEED SENSOR<br><br>* Fr. SUSP. POSITION CHANGE SENSOR<br><br>* R. SUSP. POSITION CHANGE SENSOR<br><br>* BRAKE SENSOR |
| | MAINTINING VEHICLE HEIGHT RESPONSE TO INCREASED LOAD | ORDINARY TIME TO MAINTAIN STANDARD VEHICLE HEIGHT | VEHICLE RAISING CONTROL AT 0 - 15 km/h<br><br>START OF REGULATION AT 15 km/h FOR STANDARD VEHICLE HEIGHT | * VEHICLE SPEED SENSOR<br><br>* Fr. SUSP. POSITION SENSOR<br><br>* R. SUSP. POSITION SENSOR |

FIG. 17

| OBJECT OF CONTROL | | CONTROL ACTION | OPERATING CONDITIONS | SENSOR |
|---|---|---|---|---|
| POSITION CONTROL | PREVENTING LOWERING OF VEHICLE REAR WHEN ASCENDING AN UP GRADE | MAINTINING STANDARD VEHICLE HEIGHT AT HORIZONTAL POSITION (REAR UP, FRONT DOWN) | START OF REGULATION AT SPEED ≥ 15 km/h WHEN FRONT OF VEHICLE IS LOWERED PAST FIXED TIME | * VEHICLE SPEED SENSOR<br><br>* Fr. SUSP. POSITION SENSOR<br><br>* R. SUSP. POSITION SENSOR |
| | PREVENTING LOWERING OF VEHICLE FRONT WHEN DESCENDING A DOWN GRADE | MAINTAINING STANDARD VEHICLE HEIGHT AT HORIZONTAL POSITION (FRONT UP, REAR DOWN) | START OF REGULATION AT SPEEDS ≥ 15 km/h WHEN FRONT OF VEHICLE IS LOWERED PAST A FIXED TIME | * VEHICLE SPEED SENSOR<br><br>* Fr. SUSP. POSITION SENSOR<br><br>* R. SUSP. POSITION SENSOR |

FIG.18

| | OBJECT OF CONTROL | CONTROL ACTION | | | OPERATING CONDITIONS | SENSOR | CONTROL ELEMENT | | | | | |
|---|---|---|---|---|---|---|---|---|---|---|---|---|
| | | | | | | | DAMPING FORCE | | PRE-LOAD | | SPRING CONSTANT | |
| MODE CONTROL | RUNNING SENSATION | SOFT/MEDIUM/HARD MODE | | | MANUAL SELECTION | RUNNING MODE SWITCH S8 | ○ | ○ | — | — | ○ | ○ |
| | | | DAMPING FORCE | SPRING CONSTANT MODE | | | | | | | | |
| | | SOFT | S | S | | | | | | | | |
| | | MEDIUM | H | S | | | | | | | | |
| | | HARD | H | H | | | | | | | | |
| VEHICLE HEIGHT | IMPROVEMENT OF LEG POSITION AT VERY LOW OPERATING SPEEDS | SEAT HEIGHT LOWERED 20MM 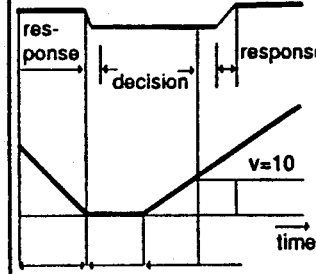 | | | V=10 KM/HR: LOWER VEHICLE HEIGHT V=10KM/HR: START OF HEIGHT ADJUSTMENT Height adjustment is restrained when steering angle switch is on | Vehicle speed S6 FR/RR Cush. Disp. Brake S2,S3, S9 Vehicle speed S6 FR/RR Cush. Disp. Steering angle S2,S3 | — | — | ○ | ○ | — | — |
| | MAINTAINING VEHICLE HIGH IN RESPONSE TO INCREASED LOAD | IF CAR HEIGHT IS PERMANENTLY MAINTAINED AT A STANDARD HEIGHT 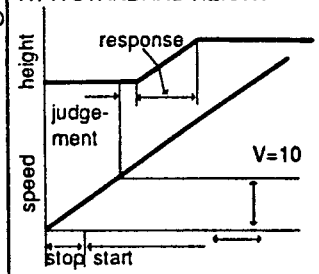 | | | V=10 KM?HR: START OF HEIGHT ADJUSTMENT Height adjustment is restrained when steering angle switch is on | Vehicle speed S6 FR/RR Cush. Disp. Steering angle S2,S3, S5 | — | — | ○ | ○ | — | — |
| POSITION CONTROL | PREVENTING LOWERING OF VEHICLE REAR WHEN ASCENDING AN UP-GRADE | MAINTAIN PRESET HEIGHT WITH RESPECT TO GROUND (AGAINST LOWERING OF REAR) 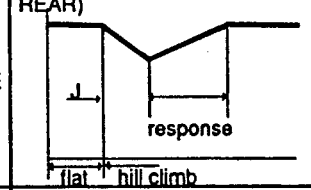 | | | V≥10KM/HR and rear height is lower than a preset value longer than a preset time interval | Vehicle speed S6 FR/RR Cush. Disp. Steering angle S2,S3, S5 | — | — | (○) | ○ | — | — |
| | PREVENTING LOWERING OF VEHICLE FRONT WHEN DESCENDING A DOWN-GRADE | MAINTAIN PRESET HEIGHT WITH RESPECT TO GROUND (AGAINST LOWERING OF FRONT) 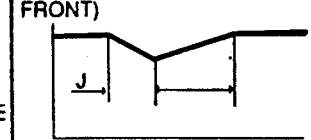 | | | V≥10 KM/HR and front height is lower than a preset value longer than a preset time interval | Vehicle speed S6 FR/RR Cush. Disp. Steering angle S2,S3, S5 | — | — | ○ | (○) | — | — |

FIG.19

| OBJECT OF CONTROL | CONTROL ACTION | OPERATING CONDITIONS | SENSOR | CONTROL ELEMENT ||||||
|---|---|---|---|---|---|---|---|---|---|
| | | | | DAMPING FORCE || PRE-LOAD || SPRING CONSTANT ||
| | | | | FR | RR | FR | RR | FR | RR |
| VEHICLE HEIGHT — ANTI-SQUAT | DAMPING FORCE: FR EXTENSION, RR COMPRESSION (released 1 sec later); DF vs TIME, 0.1 SEC, 1 SEC RESPONSE | Throttle aperture and engine speed increase, are both higher than preset values | Throttle aperture S4; Engine speed S7 | ◯ | ◯ | — | — | — | — |
| VEHICLE HEIGHT — ANTI-DIVE (ACCUTE ACCEL-OFF) (ACCUTE BRAKING) | DAMPING FORCE: FR COMPRESSION, RR EXTENSION (released 1 sec later); DF vs TIME, 0.1 SEC, 1 SEC RESPONSE | Throttle aperture and engine speed decrease, are both greater than preset values | Throttle aperture S4; Engine speed S7 | ◯ | ◯ | — | — | — | — |
| | DAMPING FORCE: FR COMPRESSION, RR EXTENSION; FR: React directly to braking force; RR: Cancel after 1 sec and return to original position | Increasing braking force | BRAKE S9 | ◯ | ◯ | — | — | — | — |
| SHIFT CHANGE (RESTRAINT OF PITCHING) | DAMPING FORCE: FR COMPRESSION, RR EXTENSION | Clutch switch gear position switch and throttle aperture are all positive | Clutch SW, Gear position SW, Throttle aperture SW, S10, S11, S4 | ◯ | ◯ | — | — | — | — |

FIG. 20 (CONTINUED)

| | | | | | | | | | | |
|---|---|---|---|---|---|---|---|---|---|---|
| POSITION CONTROL | HIGH SPEED OPERATION | | V<80 | V>80 | V≥80 km/hr | Vehicle speed S6 | ○ | ○ | — | — | ○ ○ |
| | | FR | SOFT | MEDIUM | | | | | | | |
| | | RR | MEDIUM | HARD | | | | | | | |
| | | MODE CHANGE | | | | | | | | | |
| | RESTRAINT OF REAR JUMPING OFF AT ROUGH ROADS | | DAMPING FORCE | | Vertical acceleration of front wheel is higher than a preset value | Sensor is near front suspension | — | ○ | — | — | — — |
| | | RR | COMPRESSION | | | | | | | | |

(CONTINUED) FIG. 20

ADJUSTABLE HEIGHT SUSPENSION MECHANISM FOR TWO-WHEELED MOTOR VEHICLES

This application is a continuation of application Ser. No. 07/408,044, filed Sep. 15, 1989 now abandoned.

BACKGROUND OF THE INVENTION

1. Field of the Invention

The field of the present invention is adjustable suspension systems for two-wheeled motor vehicles.

2. Prior Art

In recent years there has been a need for suspension mechanisms for two-wheeled motor vehicles which are adjustable as to suspension characteristics for accommodating different riding conditions and for height adjustment. In the case of automobiles, suspensions accomplishing the foregoing objectives have been devised. However, the application of such automobile suspension mechanisms to motorcycles and other two-wheeled motor vehicles is not practical. With two-wheeled motor vehicles, mounting space for any suspension system is limited and there is no place for such conventional adjustable suspension mechanisms. Further, the weight of such systems is excessive and, in their current form, would severely imbalance the motorcycle if they could be used at all.

SUMMARY OF THE INVENTION

The intent of the present invention is to solve the aforementioned problems by providing control over the extension and stiffness of the front and rear suspensions in a manner to suit the needs of the rider and the riding conditions. Such a system is capable of being compact and lightweight with a minimum number of components, substantial reliability and minimum energy consumption.

In an aspect of the present invention, the operation to vary either or both the spring rate or spring extension may be accomplished through hydraulic cylinders which provide for a release of hydraulic pressure when the vehicle is stopped or operated at a very low speed. This causes the vehicle to be lowered to a mechanical stop not requiring continued hydraulic pressure with associated energy consumption.

Thus, height adjustment and spring rate adjustment may be accomplished for two-wheeled vehicles in a compact manner without unnecessarily duplicating components. Other and further objects and advantages will appear hereinafter.

A BRIEF DESCRIPTION OF THE DRAWINGS

FIG. 1 is a total plan view of a two-wheeled motor vehicle.

FIG. 2 is a total side view of a two-wheeled motor vehicle.

FIG. 4 is a cross-sectional right side view of a portion of a front suspension mechanism of a preferred embodiment of the present invention.

FIG. 7 is a detailed view of the circular section labeled VII in FIG. 4.

FIG. 11 is a cross-sectional side view of a portion of a rear suspension mechanism of a preferred embodiment of the present invention.

FIG. 12 is a detailed view of the circular section labeled XII in FIG. 11.

FIGS. 17, 18 and 28 are explanatory figures showing the overall operation of a suspension mechanism of a first preferred embodiment of the present invention.

FIGS. 19 and 20 show the operation of the total suspension mechanism of a second preferred embodiment of the present invention.

DETAILED DESCRIPTION OF THE PREFERRED EMBODIMENTS OF THE PRESENT INVENTION

In the following sections, two preferred embodiments of the present invention will be described with reference to the drawings.

Figure 3:
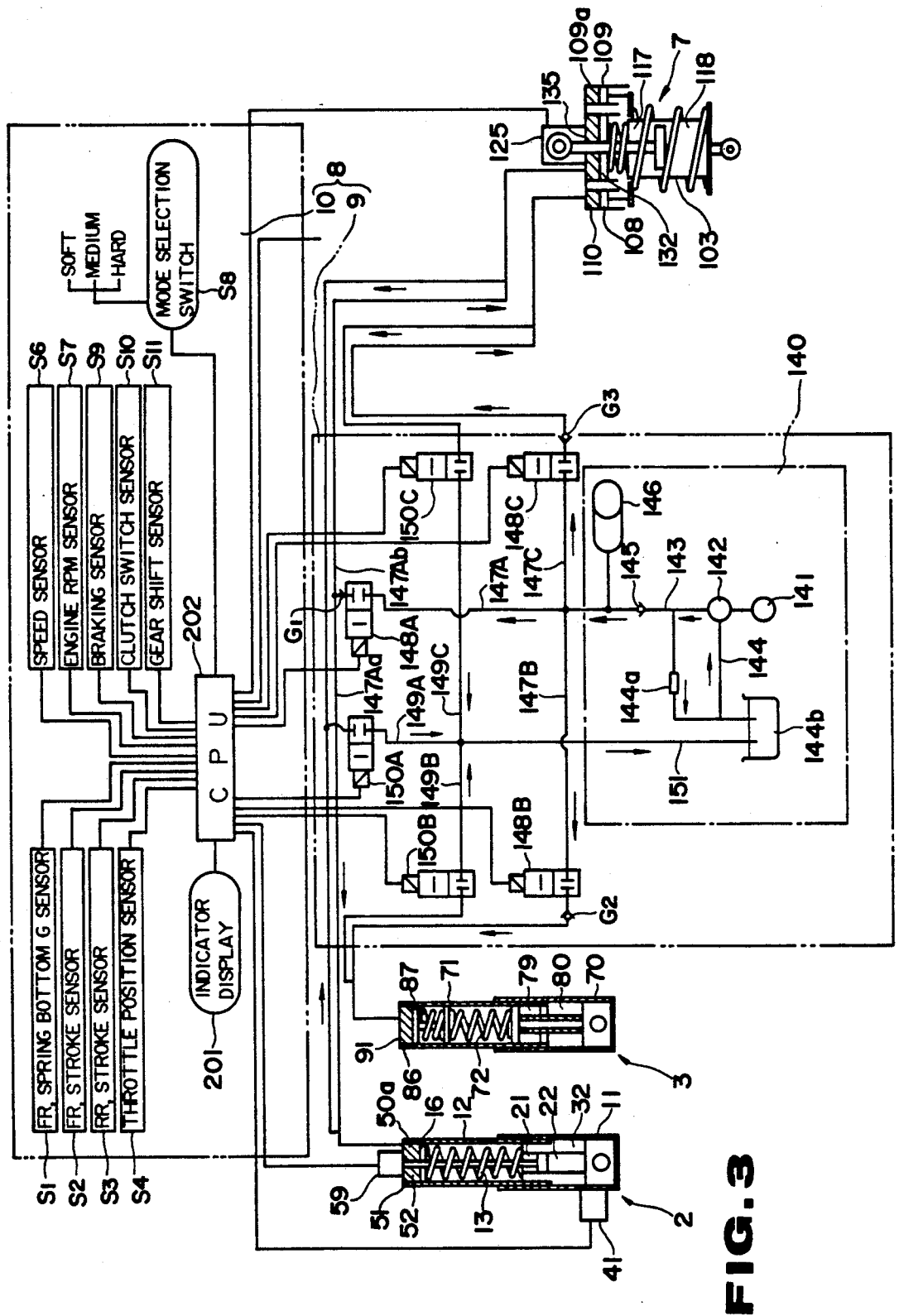
FIG. 3 is a schematic organization representation of a first preferred embodiment of the present invention.

The suspension apparatus of the present preferred embodiment, as seen in FIGS. 1, 2, and 3 is fundamentally comprised of paired right and left front suspension units 2, 3 respectively, which support the front axle 1; a unitary rear suspension unit 7 situated between the side frame at the lower portion of seat 4 and rear fork 6, connecting with rear fork 6 via link 6a; and a control unit 8 which supplies hydraulic fluid to the respective hydraulic sections of left and right suspension units 2, 3 and rear suspension unit 7 effecting height control as well damping energy control by means of on electric signals sent to an intermediate control motor.

For the above mentioned paired left and right front suspension units 2, 3, the right unit 2 has both a vehicle height governing and damping force governing function while the left suspension unit 3 has a spring constant adjusting function. The rear suspension unit 7 has vehicle height governing and damping force governing function as well as spring constant adjusting function. The control unit 8 is composed of an oil pressure managing unit 9 which supplies hydraulic fluid at a fixed pressure to the respective hydraulic cylinders of left and right suspension units 2, 3 and rear suspension unit 7 and which conversely releases the above mentioned applied hydraulic pressure; and a governing apparatus 10 by which means electric signals are sent to the above mentioned oil pressure managing unit 9 in response to the vehicles operating conditions thereby controlling oil pressure managing unit 9 while at the same time, directly sending electric signals to control motors provided on suspension units 2 and 7.

The following is a supplementary explanation for the layout of suspension accessories and the primary parts of a motorcycle with reference to FIGS. 1 and 2.

G-sensor $S_1$ is installed at the lower end of left front suspension 3 while stroke sensor $S_2$, which measures the height of the vehicle (or the length of the front suspension unit), is attached to the outside of right front suspension 2.

Numbered 161 is the fuel tank which is located over the vehicle engine. At the front end of the tank is filler tube 162, while CPU 202, which controls the suspension, is mounted in a hollow spot at the rear end of the fuel tank 161.

Under the rear end of the fuel tank are reserve tank 144b which stores hydraulic fluid and pump 142 with motor 141 which feeds the suspension fluid by pressure. Control valves coded 148A, 148B, 148C, 150A, 150B, and 150C constituting oil pressure managing unit 9 are placed on base 159 between the reserve tank and the pump. Base 159 is held by a bracket, not indicated in the figures, extending from frame 5.

Stroke sensor $S_3$ for detecting the height of the rear body is attached near pivot P of rear fork 6. The main part of stroke sensor $S_3$ is installed on rear stay 5a of frame 5 by brackets while its moving part is attached to rear folk 6 by a linkage. Accumulator 146, which stores the suspension fluid, is placed in the rear cover behind seat 4. In the following section, the above described components will be described in further detail with reference to FIGS. 4 to 7.

RIGHT FRONT SUSPENSION UNIT

The above mentioned right front suspension unit 2 has a damping force governing function as well as a pre-load application vehicle height adjusting function. (See FIGS. 4, 5, 6, and 7).

Fork pipe 12 is installed within bottom case 11 so as to slide freely within, this bottom case 11 being a cylindrical pipe having a closed bottom end. The bottom case 11 is fixed on the previously mentioned front axle 1 and fork pipe 12 is fixed to the side of the vehicle's frame via top and bottom bridges. Prior to installing fork pipe 12, a coil spring as well as an oil damping apparatus, or the like were inserted inside it as a unit in the form of a cartridge 13.

Coil spring 13 is situated along the central axis of fork pipe 12. Operating together as a unit, fork pipe 12 and coil spring 13 are installed at the outer circumference of load pipe 15. The upper end of load pipe 15 is supported by pre-load adjuster piston 16 via spring seat 17. The lower end of load pipe 15 is supported by cylinder 18, which is inserted within bottom case 11, via a spring seat 18a.

Concerning the lower portion of load pipe 15, hydraulic chamber 20 is formed inside load pipe 15 while other hydraulic chambers 21 and 22, which are separated into upper and lower chambers by piston valve 19 attached to the tip of load pipe 15, are set inside of cylinder 18.

Figure 5:
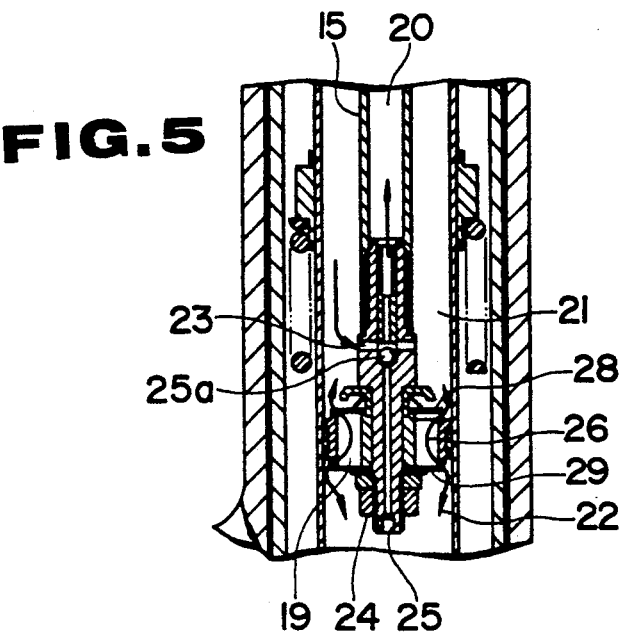
FIG. 5 is a detailed view of the circular section labeled V in FIG. 4.

As FIG. 5 shows, hydraulic chambers 20 and 21 are connected to each other by port 23 which is cut into the side wall of load pipe 15. Similarly, hydraulic chambers 20 and 22 are connected to each other by through port 25 in plug 24 which is fixed to the lower tip of load pipe 15. At the upper end of through port 25 is check ball 25a. This ball contacts the upper valve seat and stops the rising flow of oil when in its upper position, and it controls oil flow into through port 25 when in its lower position. Hydraulic chambers 21 and 22 are connected to each other by oil passage 26 in piston valve 19. This oil passage, as indicated in FIG. 5, has two types of channels; one is for upward flow and the other allows downward flow. Some of the type channels are positioned one after the other around the periphery of piston valve 19. At the upper part of oil passage 26, there is check valve 28 which is closed by a spring while plate valve 29 is set at the lower part. When both check valve 28 and plate valve 29 are closed, oil passage 26 allows upward and downward flow of oil through the oil channels.

In this piston valve 19, check valve 28 opens allowing smooth upward oil flow and plate valve 29 controls and creates a certain amount of resistance in the oil flow downward.

Figure 6:
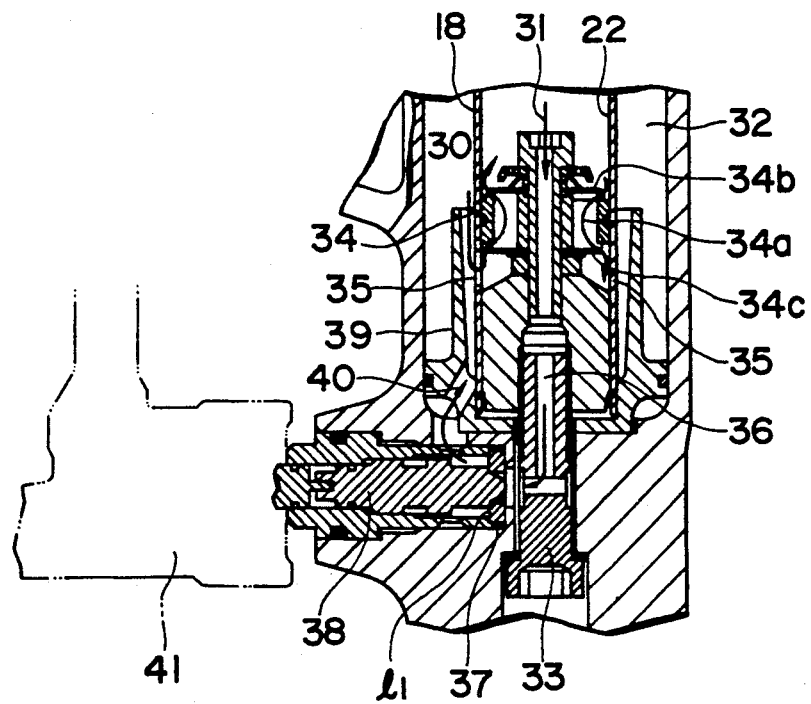
FIG. 6 is a detailed view of the circular section labeled VI in FIG. 4.

As shown in FIG. 6, hydraulic chamber 22 at the lower part of cylinder 18 is, by oil passages 30 and 31, connected with oil chamber 32, which is formed between cylinder 18 and bottom case 11.

Oil passage 30 reaches oil chamber 32 through port 35 cut into the side wall of the cylinder and piston valve 34, which is filed on the periphery of the tip of socket bolt 33. The bolt is fixed to the bottom of bottom case 11.

Oil passage 31, also reaches oil chamber 32. This passage goes through port 36, which runs along the axis of socket bolt 33; clearance $l_1$ between valve seat 37 and needle 38; and ports 40 pass through oil lock piece 39.

Piston valve 34 is similar to piston valve 19 in terms of structure. Check valve 34b is at the upper part of oil passage 34a while plate valve 34c is placed at the lower part. Thus smooth upward flow of oil is secured while a certain resistance grows in the channels when oil goes downward.

Clearance $l_1$ between valve seat 37 and needle 38 is variable because needle 38 is moved and controlled by damping force adjustable motor 41. This adjustment is mainly for controlling damping force when right front suspension unit 2 is in its retraction phase.

Concerning the upper portion of load pipe 15 and other components in its vicinity, as FIG. 7 indicates, cap 50 is fixed above load pipe 15 and cylinder 51 is fixed to cap 50 between fork pipe 12 and load pipe 15. The pre-load adjuster piston 16 is in the cylinder. Hydraulic chamber 52, which is formed on the periphery of load pipe 15 positioned in cylinder 51, is connected to control unit 8 through oil passage 53.

Head 50a of cap 50 functions as a stopper which determines the position of pre-load adjuster piston 16 to where the piston retracts as oil is released from hydraulic chamber 52.

Hydraulic chamber 20 of load pipe 15 is connected to cylinder 51 and oil chamber 58, which is formed between the periphery of pre-load adjuster piston 16 and fork pipe 12, through clearance $l_2$ located between valve sheet 54 and needle 55, port 56 on the side wall of load pipe 15, and passage 57 through cap 50. Oil flows from hydraulic chamber 20 to oil chamber 58 through clearance $l_2$, port 56, and passage 57. Coil spring 13 is seated in oil chamber 58. This oil chamber is also joined with oil chamber 32 through a port cut in spring seat 18a.

Clearance $l_2$ between valve sheet 54 and needle 55 is variable as the needle is moved by damping force adjustable motor 59. This adjustment is mainly for controlling damping force when the suspension unit is extending.

In FIG. 4, rebound stopper 60, rebound spring 61, and rod guide 62 can be seen. As seen in FIG. 1, G sensor $S_1$ is installed on the lower end of right front suspension unit 2 and functions to detect increasing velocity of movement in the axial direction of the lower end of right front suspension unit 2. Stroke sensor $S_2$ serves to detect expansion and contraction of right front suspension unit 2. For stroke sensor $S_2$, the casing is fixed on the bottom bridge, and extending from the casing, a link is attached, the end of which is pivotably mounted on bottom case 11.

In the following is a description of the action of right front suspension unit 2.

When right front suspension unit 2 is compressed due to external force, the pressure in hydraulic chamber 22 located below cylinder 18 will increase while that in hydraulic chamber 21 placed above the same cylinder will decrease. Since check valve 28 is opened by a pressure differential, oil will swiftly flow from hydraulic chamber 22 to hydraulic chamber 21 through oil passage 26 of piston valve 19. Moreover, the oil in hydraulic chamber 22 will never flow to hydraulic chamber 20 in load pipe 15 through port 25 because of check ball 25a which is seated in its upper part.

At this time, load pipe 15 will travel down into cylinder 18. Thus, the total capacity of hydraulic chamber 21 and hydraulic chamber 22 will decrease by an amount equal to this entry of the rod. Surplus oil or an amount of oil equal to this difference should naturally flow elsewhere, that is, as illustrated in FIG. 6, to oil chamber 32 through oil passage 30 and oil passage 31.

Passage resistance to oil running through oil passage 34a of piston valve 34 is fixed by adjusting plate valve 34c while clearance $l_1$ between valve seat 37 and needle 38 is adjustable because needle 38 is adjusted by damping force adjustable motor 41. By setting clearance $l_1$ at a desired value, the damping force of right front suspension unit 2 is controlled when the suspension contracts. When right front suspension unit 2 extends, the pressure in hydraulic chamber 21 will increase and that in hydraulic chamber 22 will decrease.

Since check valve 28 is closed by a pressure differential, oil swiftly rushes from hydraulic chamber 21 to hydraulic chamber 22 through one of the oil passage 26 connected to plate valve 29. At this time, a certain amount of damping force can be obtained due to the action of plate valve 29.

Moreover, the oil in hydraulic chamber 21 progresses to hydraulic chamber 20 inside load pipe 15 mainly through port 23 in load pipe 15. Thus, the pressure therein increases.

Oil runs from hydraulic chamber 20, as shown in FIG. 7, to the outside oil chamber 58 through clearance $l_2$ between valve sheet 54 and needle 55, and port 56 and passage 57. During this operation, clearance $l_2$ can be adjusted by moving needle 55 with damping force adjustable motor 59. By setting clearance $l_2$ at a desired value, the damping force of right front suspension unit 2 is controlled when the suspension unit extends.

On the other hand, although the pressure in hydraulic chamber 22 decreases, check valve 34b of piston valve 34 is immediately opened due to a pressure differential and the oil in oil chamber 32 flows into hydraulic chamber 22 through oil passage 34a. The pressure in the hydraulic chamber never decreases beyond a certain value and therefore vapor never forms within.

An additional amount of oil flows into hydraulic chamber 22 through oil passage 31 which consists of port 40 in oil lock piece 39 and clearance $l_1$ between needle 38 and valve seat 37.

When a desired amount of oil is supplied from oil pressure managing unit 9 to hydraulic chamber 52 at the top of fork pipe 12, pre-load adjuster piston 16 is pressed downward as well as spring seat 17.

FIG. 4 shows the state in which pre-load adjuster piston 16 is pressed downward from when the vehicle is in an elevated position. In this manner, fork pipe 12 is raised by the reaction force of coil spring 13 when a specific load is applied to coil spring 13. The front of the vehicle is thus lifted.

Conversely, pre-load adjuster piston 16 will withdraw into cylinder 51 and touch head 50a as a result of pressure reduction of hydraulic chamber 52. Thus, the front of the vehicle will be lowered due to a decrease in reactive force from coil spring 13.

The following is a summary of the preceding description:

1. It is possible to adjust the damping force of 2 in the retraction phase by controlling 41.
2. It is possible to adjust the damping force of 2 in the extension phase by controlling 59.
3. It is possible to adjust the height of the front of the vehicle by controlling the oil supply to hydraulic chamber 52 in cylinder 51 with oil pressure managing unit 9.

In the above described and illustrated example, through the action of damping force adjustable motor 41 and damping force adjustable motor 59, needle 38 and needle 55 are caused to move. Although the gaps between the respective needles and valve seats are adjusted, it is also suitable to change the oil flow resistance by adjusting the respective orifices through the action of damping force adjustable motor 41 and damping force adjustable motor 59.

LEFT FRONT SUSPENSION UNIT

Figure 8:
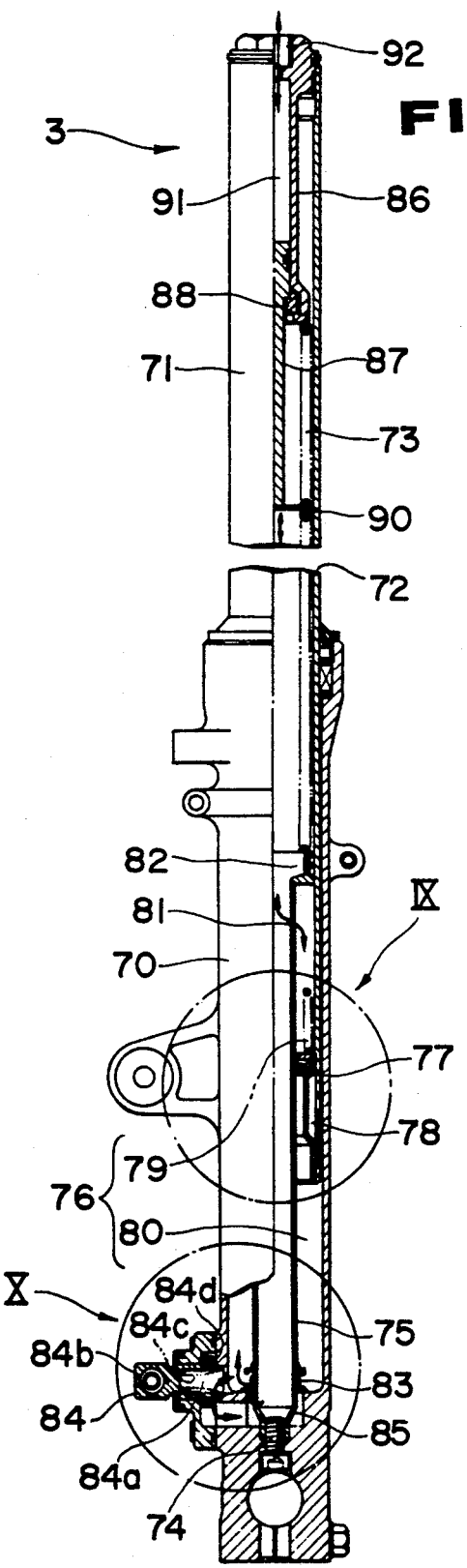
FIG. 8 is a cross-sectional left side view of a portion of a front suspension mechanism of a preferred embodiment of the present invention.
Figure 9:
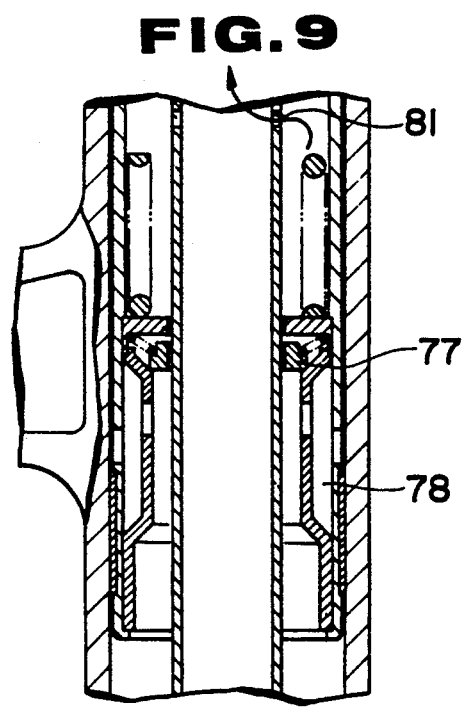
FIG. 9 is a detailed view of the circular section labeled IX in FIG. 8.
Figure 10:
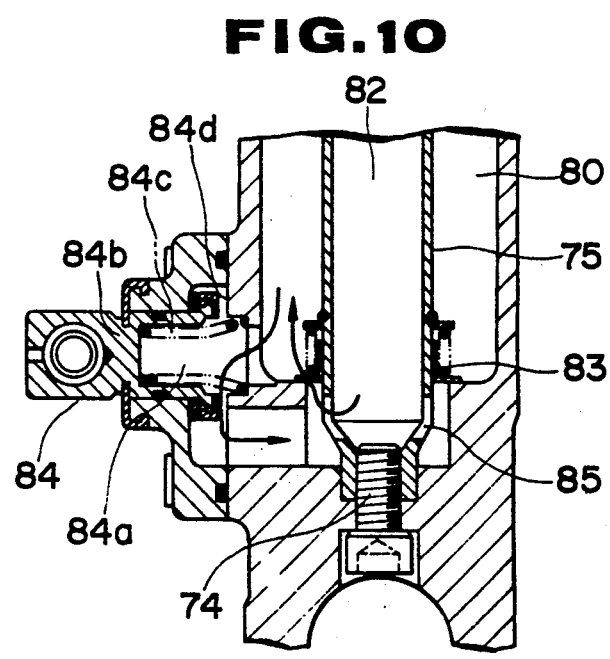
FIG. 10 is a detailed view of the circular section labeled X in FIG. 8.

Left front suspension unit 3 has the capability of changing the spring constant as a whole. (See FIGS. 8, 9, and 10).

Fork pipe 71 is installed within bottom casing 70 so as to slide freely within, this bottom casing 70 being a cylindrical pipe having a closed bottom end. In fork pipe 71, coil springs 72 and 73, of different lengths are seated in series.

Seat pipe 75 is fixed by socket bolt 74 to bottom casing 70. The lower end of the longer coil spring 72 touches the upper end of seat pipe 75. Hydraulic chamber 76 is between bottom casing 70 and seat pipe 75. Hydraulic chamber 76 is divided into upper hydraulic chamber 79 and lower hydraulic chamber 80 by divider 78 which has free valve 77 at the intermediate step of seat pipe 75.

Upper hydraulic chamber 79 is connected with oil chamber 82 through port 81 in the side wall of seat pipe 75. Lower hydraulic chamber 80 is also joined with oil chamber 82 through oil lock valve 83, oil passage 84a of antilock dive mechanism antilock dive mechanism antilock dive mechanism 84, and port 85 running through the lower part of seat pipe 75 connected thereto.

Fixed on the upper point of fork pipe 71 is spring constant adjusting cylinder 86 and spring constant adjusting piston 87 is inserted therein. The periphery of spring constant adjusting cylinder 86 is in contact with the upper end of the shorter coil spring 73 through piston stopper bolt 88.

In contact with the lower end of spring constant adjusting piston 87 is spring seat 90 which is also sandwiched between coil spring 72 and coil spring 73. Hydraulic chamber 91 in spring constant adjusting cylinder 86 is connected to oil pressure managing unit 9 through oil passage 92 running around the upper end of spring constant adjusting cylinder 86.

In the following is a description of the action of left front suspension unit 3.

When left front suspension unit 3 is compressed due to external force, the pressure in lower hydraulic chamber 80 located outside seat pipe 75 will increase and that of upper hydraulic chamber 79 will decrease. Since free valve 77 is opened by a pressure differential, oil in lower hydraulic chamber 80 will flow up to upper hydraulic chamber 79 through divider 78 and prevent the pressure of the same from dropping.

At the same time, the total capacity of upper hydraulic chamber 79 and lower hydraulic chamber 80 will decrease by an amount equal to the entry of fork pipe 71. Surplus oil or an amount of oil equal to this difference will tend to flow into oil chamber 82 through oil lock valve 83 and oil passage 84a of antilock dive mechanism 84.

Braking is applied to the front wheel at this moment. When a prescribed compression force is transferred from the brake system to antilock dive mechanism 84, piston 84b will travel toward valve seat 84d and oppose the excess force of spring 84c. Oil passage 84a will be closed or narrowed and passage resistance will grow larger, resisting the force on fork pipe 71. As a result, it is possible to prevent the front of the vehicle from diving.

Conversely, when left front suspension unit 3 extends, the pressure in upper hydraulic chamber 79 will increase whereas that in lower hydraulic chamber 80 will decrease. The oil in upper hydraulic chamber 79 will flow into oil chamber 82 through port 81 in seat pipe 75. Due to the oil flow as well as the pressure differential, oil lock valve 83 will open. The oil in oil chamber 82 will therefore rush into lower hydraulic chamber 80 through seat pipe 75 on the lower side wall of seat pipe 75 and oil lock valve 83.

When oil under the prescribed pressure is transferred from oil pressure managing unit 9 to hydraulic chamber 91 at the upper part of suspension unit, spring constant adjusting piston 87 will extend and spring seat 90 will be lowered. The load of the shorter coil spring 73 will be reduced while that on the longer coil spring 72 will increase. It is mainly the longer spring which will contribute to the action of the suspension unit. In fact, it can be said that if the number of coil spring turns is changed, the spring constant of the suspension is subsequently altered as a whole. If the supply of oil to hydraulic chamber 91 is stopped and the pressure in the same is released, spring constant adjusting piston 87 will return to its original position and both coil spring 72 and coil spring 73 will contribute to the action of the suspension unit.

The following is a summary of the above description:

1. It is practical to adjust the spring constant of left front suspension unit 3 by controlling the oil supply to hydraulic chamber 91 of spring constant adjusting cylinder 86 with oil pressure managing unit 9.

REAR SUSPENSION UNIT

Rear suspension unit 7 has the functions of adjusting damping force, adjusting the height of the vehicle allowing preload, and altering its spring constant.

As FIG. 11 illustrates, located from the top to the bottom are spring constant adjusting body 100, adjusting pipe 102 which is fixed to spring constant adjusting body 100 with stopper nut 101, and main pipe 103 inserted into adjusting pipe 102 so as to slide freely within.

Spring constant adjusting body spring constant adjusting body 100 is fixed to the vehicle body frame while main pipe 103 is, as shown in FIG. 2, connected with link 6a extending from rear fork 6.

On the periphery of main pipe 103, coil spring 104 is installed. The lower end of coil spring 104 is supported by spring seat 105 which is fixed to main pipe 103, and the upper end is firmly held by preload adjuster piston 108 through spring seat 106 and spring seat 107.

Preload adjuster piston preload adjuster piston 108 is set so as to slide freely within preload adjuster cylinder 109 which is fixed on the periphery of adjusting pipe 102. Preload adjuster cylinder 109 is connected to oil pressure managing unit 9 through the prescribed oil passage 111.

Bottom 109a of preload adjuster cylinder 109 will function as a stopper determining the travel limit of preload adjuster piston 108 when oil in hydraulic chamber 110 is released and the piston returns.

At the upper part of spring constant adjusting body 100, a hollow rod 112 is fixed along the axis thereof. Inside main pipe 103, hydraulic chamber 113 is formed with its lower end divided by free piston 114 and its upper end by rod guide casing 115. This hydraulic chamber 113 is divided into upper chamber 117 and lower chamber 118 by piston valve 116 which is fixed to the end of hollow rod 112. Piston valve 116 has external port external port 119 and internal port 120 on its external and internal sides respectively.

Since external port 119 has plate valve 121 on its upper end, it allows oil flow from lower chamber 118 to upper chamber 117 applying a prescribed amount of resistance to the flow and thereby stops oil from flowing in the opposite direction.

Conversely, internal port 120 allows oil flow from the upper chamber to the lower one with plate valve 121a placed at this lower part applying a prescribed resistance. Lateral port 122 is formed in the side wall of hollow rod 112 facing upper chamber 117. This lateral port 122 reaches a clearance formed between hollow rod port 112a and the periphery of needle 123 which penetrates hollow rod port 112a. Through this particular clearance, upper chamber 117 is connected to lower chamber 118.

Valve seat 124 is positioned at the lower end of needle 123. Needle 123 is moved along the axis of spring constant adjusting body 100 by damping force adjusting motor 125 which is installed on the outside of the same cylinder body. An inert gas, for example, nitrogen, is charged in lower chamber 126 of free piston 114. When rear suspension unit 7 contracts and extends, hollow rod 112 enters and withdraws from upper chamber 117 and lower chamber 118. lower chamber 126 absorbs the change in the total capacity of the two chambers arising from the reciprocating action of the suspension by means of movement of free piston 114.

On the periphery of hollow rod 112, as well as inside adjusting pipe 102, rubber spring 130 is installed. Instead of rubber, other materials may be used for this spring, for example, a coil spring.

The lower end of rubber spring 130 is in contact with end plate 131 supported by the upper tip of main pipe 103 while its upper end touches the lower surface of spring constant adjusting piston 132. spring constant adjusting piston 132 is inserted so as to slide freely within spring constant adjusting body 100. Hydraulic chamber 135 is formed between spring constant adjusting piston 132 and piston base 134 of which the upper tip is held by lock nut 133. Hydraulic chamber 135 is connected with oil pressure managing unit 9 by oil passage 136.

As shown in FIG. 2, stroke sensor $S_3$ is equipped between the body frame and rear fork 6 to detect the amount of the rear suspension unit's contraction and extension.

In the following section, the action of rear suspension unit 7 will be described.

When rear suspension unit 7 is compressed due to external force, the pressure in lower chamber 118 will increase and that in upper chamber 117 will decrease. Since plate valve 121 opens in response to a pressure differential, oil in lower chamber 118 will flow to upper chamber 117 mainly through external port 119 of piston valve 116 with a prescribed passage resistance. At the same time, hollow rod 112 enters upper chamber 117 and lower chamber 118 and surplus oil will be absorbed by free piston 114 as it travels downward. Even so, damping force will be obtained as oil goes through clearance $l_3$ formed between needle 123 and valve seat 124. When rear suspension unit 7 extends, on the other hand, the pressure in upper chamber 117 increases and that in lower chamber 118 decreases.

Since plate valve 121 is closed, oil in upper chamber 117 cannot flow through external port 119. Thus, oil will flow to lower chamber 118 through internal port 120, lateral port 122 of hollow rod 112, and a clearance formed at the periphery of the needle. Passage resistance in internal port 120 is fixed while that in the needle periphery will be freely adjusted by the movement of 123 which is controlled by damping force adjusting motor 125 in clearance $l_3$ between valve seat 124 and needle 123. The damping force of rear suspension unit 7 during the extension phase can therefore be specified at any desired rate.

When oil under a prescribed pressure is transferred from oil pressure managing unit 9 to hydraulic chamber 110 in preload adjuster cylinder 109, lower chamber 118 will be forced downward and, at the same time, spring seat 106 and spring seat 107 will travel downward as well and a prescribed load will be applied to coil spring 104. The reactive force of coil spring 104 will then push preload adjuster cylinder 109 and spring constant adjusting body 100, thus, the rear of the vehicle will be raised.

If the pressure in hydraulic chamber 110 is released in the above described state, preload adjuster piston 108 will retract into preload adjuster cylinder 109 and contact bottom 109a, as shown in FIG. 11. Also, the reactive force of coil spring 104 will decrease and the rear of the vehicle will consequently be lowered.

When oil under a prescribed pressure is supplied from oil pressure managing unit 9 to hydraulic chamber 135 in spring constant adjusting body 100, hydraulic chamber 135 will travel downward pushing rubber spring 130.

As described above, rubber spring 130 is given an initial load. The spring will then be under load so as to obtain a large elastic coefficient. As a result, the overall spring constant of the rear suspension, which is derived from rubber spring 130 and coil spring 104 will be increased.

If the supply of oil to hydraulic chamber 135 is cut off and the pressure therein is released, spring constant adjusting piston 132 will return to its original position and the prescribed load on rubber spring 130 will be canceled. In other words, the overall spring constant of the rear suspension will be reduced.

The following is a summary of the previous description of the action of rear suspension unit 7:

1. It is possible to adjust the damping force of rear suspension unit 7 during its contraction and extension phases by controlling damping force adjusting motor 125.

2. It is possible to adjust the height of the rear of the vehicle by controlling the supply of oil to hydraulic chamber 110 in preload adjuster cylinder 109 with oil pressure managing unit 9.

3. It is practical to adjust the spring constant of rear suspension unit 7 by controlling the oil supply to hydraulic chamber 135 in spring constant adjusting body 100 with oil pressure managing unit 9.

OIL PRESSURE MANAGING UNIT

First Preferred Embodiment

A first preferred embodiment of oil pressure managing unit 9, as shown in FIG. 3, will be described in the following.

Oil pressure managing unit 9 is a device which includes a control motor and hydraulic control valves which are controlled according to electrical signals from governing apparatus 10, and supplies and releases hydraulic fluid under a prescribed pressure to and from right front suspension unit 2, left front suspension unit 3, and rear suspension unit 7. As shown in FIG. 2, when mounted on the vehicle frame, oil pressure managing unit 9 is positioned under or to the rear of fuel tank 161 so as to avoid the adverse effect of mud, water, and the like.

The area generally indicated in FIG. 3 by 140 is a system to deliver a fixed amount of oil at a fixed pressure. Its components include gear pump 142 which is connected with motor 141; a relief valve 144a provided on the output side of gear pump 142; a reserve tank 144b connected with the input side of gear pump 142. With such a system, even when the speed of motor 141 changes, the oil pressure on the gear pump 142 side of relief valve 144a remains constant and surplus oil is caused to return to gear pump 142 via return circuit 144.

This oil will be introduced to oil passage 143 by gear pump 142. Return circuit 144, with which relief valve 144A is equipped, is connected to the base of oil passage 143. Surplus oil will be returned to reserve tank 144b through the return circuit 144 when the pressure of oil passage 143 exceeds a certain value. Thus, the pressure in oil passage 143 is kept within a certain range.

One-way valve 145 is installed in oil passage 143 as well as is accumulator 146 positioned distal to one-way valve 145. The end of oil passage 143, which is closer to the accumulator, is divided into three branches 147A, 147B, and 147C. Each of the branches is equipped with electric valves 148A, 148B, and 148C, the outputs of which are connected to hydraulic chambers 52, 91, 110, and 135.

An outward oil passage 147A extends from electric valve 148A. This oil passage forks into two passages, 147Aa and 147Ab and these two passages are connected to hydraulic chamber 52 and hydraulic chamber 135, respectively.

Return oil passages 149A; 149B, and 149C return oil from outward oil passages 147A, 147B, and 147C after passing through the respective hydraulic chambers and these return oil passages are equipped with electric valves 150A, 150B, and 150C, respectively. These oil passages are joined together and connected into one oil passage, oil passage 151. Oil passage 151 is connected with reserve tank 144b. On outward oil passages 147A, 147B, and 147C, one-way valves $G_1$, $G_2$, and $G_3$ are installed.

As FIGS. 1 and 2 show, electric valves 148A, 148B, 148C, 150A, 150B, and 150C are all fixed on base 159. Also, one-way valves $G_1$, $G_2$, and $G_3$ are integrated in base 159.

Second Preferred Embodiment

Figure 13:
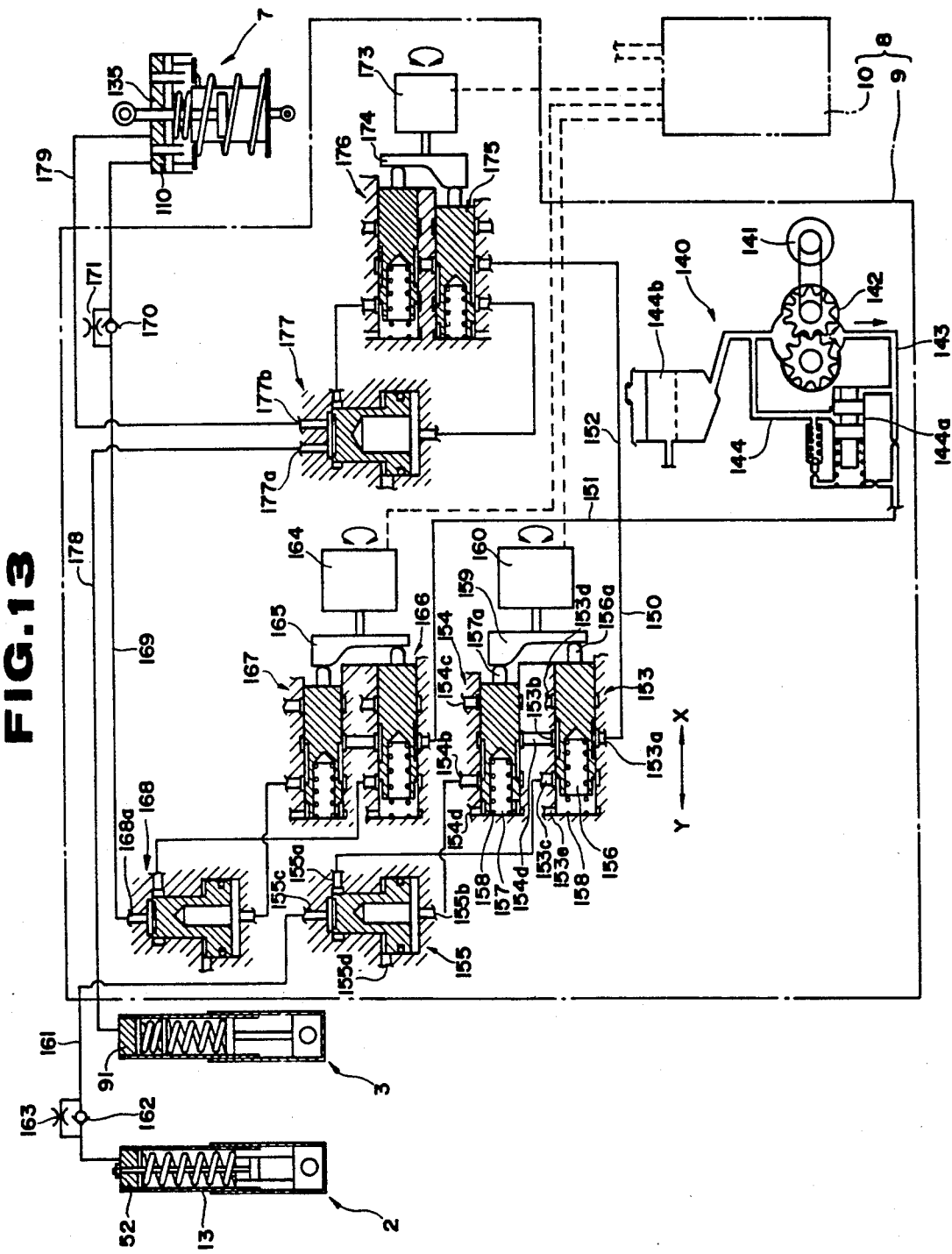
FIG. 13 is an organizational representation of a second preferred embodiment of the present invention.

A second preferred embodiment of oil pressure managing unit 9, as shown in FIG. 13, will be described in the following.

Oil pressure managing unit 9 is a device which includes a control motor and hydraulic control valves which are controlled according to electrical signals from governing apparatus 10, and supplies and releases hydraulic fluid under a prescribed pressure to and from right front suspension unit 2, left front suspension unit 3, and rear suspension unit 7. As shown in FIG. 2, when mounted on the vehicle frame, oil pressure managing unit 9 is positioned under or to the rear of fuel tank 161 so as to avoid the adverse effect of mud, water, and the like.

The area generally indicated in FIG. 3 by 140 is a system to deliver a fixed amount of oil at a fixed pressure. Its components include gear pump 142 which is connected with motor 141; a relief valve 144a provided on the output side of gear pump 142; a reserve tank 144b connected with the input side of gear pump 142. With such a system, even when the speed of motor 141 changes, the oil pressure on the gear pump 142 side of relief valve 144a remains constant and surplus oil is caused to return to gear pump 142 via return circuit 144.

This oil will be introduced to oil passage 143 by gear pump 142. Return circuit 144, with which relief valve 144A is equipped, is connected to the base of oil passage 143. Surplus oil will be returned to reserve tank 144b through the return circuit 144 when the pressure of oil passage 143 exceeds a certain value. Thus, the pressure in oil passage 143 is kept within a certain range.

The output of gear pump 144a is divided into three branches which communicate with the hydraulic chambers 52, 91, 110, and 135 via oil conduits 150, 151, and 152, thereby supplying oil at a fixed pressure.

Oil conduit 150 communicates with an interconnected pair of preload valves 153 and 154 which then in turn connect via their terminal ends with preload servo valve 155. Preload valves 153 and 154 are constructed identically and contain spools 156 and 157 which are urged by spring 158 in the direction indicated as X in FIG. 13. An end of each spool 156 and 157 protrudes outside their respective preload valves, and by means of these respective protruding portions 156a and 157a which make contact with the undulating surface of cylindrical cam 159, each spool 156 and 157 is caused to operate back and forth in the directions indicated as X and Y in FIG. 13. Cylindrical cam 159 is caused to rotate by preload control motors 160.

Port 153a of preload valve 153 connects with the above mentioned oil conduit 150. By means of a second port 153b, the oil conduit continues to connect with port 154a on neighboring preload valve 154. Similarly, port 153c continues the oil conduit which then connects with port 155a on servo valve 155. Furthermore, additional ports 153d and 153e continue the oil conduit thereby connecting with reserve tank 144b. Port 154b of the opposite preload control valve 154 continues the oil conduit thereby connecting with port 155b of servo valve 155. Additional ports 155c and 155d continue the oil conduit thereby connecting with reserve tank 144b. Port 155c of servo valve 155 continues as oil conduit 161 and connects with hydraulic chamber 52 of right front suspension unit 2. Additional port 155d continues the oil conduit connecting with reserve tank 144b. Check valve 162 and flow control valve 163 are provided in series on the above mentioned oil conduit 161.

Similarly, oil conduit 161, identical to the above, by means of preload valve control motor 164, spools of paired preload valves 166 and 167 are caused to operate in a reciprocating manner by the action of the undulating surface of cylindrical cam 165.

Port 168a of servo valve 168 continues as oil conduit 169 thereby connecting with hydraulic chamber 110 of rear suspension unit 7. Check valve 170 and flow control valve 171 are provided in series on the above mentioned oil conduit 169. In the following, the operation of valves 166, 167, 168 which are substantially identical will be described.

Similar to the above, spring constant control valves 175 and 176 connected with an end of oil conduit 152 are operated by the reciprocal action of the cylindrical cam 174 on spring constant control motor 173, and on the opposite end of oil conduit 152, spring constant control valve 177 is provided. Port 177a of servo valve 177 continues as oil conduit 178 to connect with hydraulic chamber 91 of left front suspension unit 3. Similarly, port 177b of servo valve 177 continues as oil conduit 179 to connect with hydraulic chamber 135 of rear suspension unit 7.

In the following, the function of oil pressure managing unit 9 will be described.

The height controlling function of right front suspension unit 2 as well as rear suspension unit 7 is carried out through the action of control motors 160 and 164 based on changes in the vehicle velocity, the rotation of control motors 160 and 164 being mediated and transmitted by cylindrical cams 159 and 165 as described above. This action is described in the Tables 1 and 2 below.

TABLE 1

| | Preload Control - Front | | | |
|---|---|---|---|---|
| | Valve 154 | Cam Position | Valve 153 | Cam Position |
| Start Engine | Off | Trough | Off | Trough |
| Speed $\leq$10 km/h | Off | Trough | On | Crest |
| Standard Height | On | Crest | On | Crest |
| Speed $\geq$10 km/h | Off | Trough | Off | Trough |

TABLE 2

| | Preload Control - Front | | | |
|---|---|---|---|---|
| | Valve 166 | Cam Position | Valve 167 | Cam Position |
| Start Engine | Off | Trough | Off | Trough |
| Speed ≦10 km/h | Off | Trough | On | Crest |
| Standard Height | On | Crest | On | Crest |
| Speed ≧10 km/h | Off | Trough | Off | Trough |

First explaining the hydraulic operation and the like of right front suspension unit 2, when the vehicle first starts and is at a velocity of 0 km/h, the point at which the cam 159 surface meets the spools of control valves 153 and 154 is at a trough for both, thus both are in the off condition.

Figure 14:
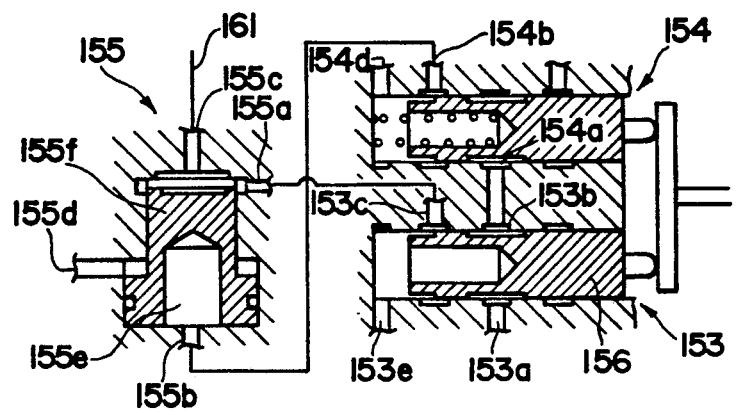
FIGS. 14, 15 and 16 are explanatory figures showing the operation of the height adjustment mechanism of a second preferred embodiment of the present invention.

As shown in FIG. 14, by virtue of the grooves on spool 156 of valve 153, ports 153a and 153b are in communication, and ports 153c and 153e are in communication. Similarly, ports 154b and 154d on valve 154 are in communication. Accordingly, oil introduced at a fixed pressure from oil conduit 150 runs through port 153a, port 153b, and through port 154a where it stops. While port 155a of servo valve 155 communicates with ports 153c and 153e of valve 153, similarly, port 155b of servo valve 155 communicates with ports 154b and 154d of valve 154 through all of which hydraulic pressure is applied. Accordingly, the hydraulic chamber 155e at the bottom part of servo valve 155 is caused to open even though hydraulic pressure is not applied through the respective ports. Because a fixed pressure is applied to port 155c due to the effect of coil spring 13 on right front suspension unit 2, piston 155f within servo valve 155 is caused to depress, whereby finally ports 155a and 155c communicate. By this effect, the oil of hydraulic chamber 52 of right front suspension unit 2 passes through oil conduit 161, ports 155c and 155a of servo valve 155, ports 153c and 153e of control valve 153, finally returning to reserve tank 144b. For this reason, the front of the vehicle is depressed without applying a fixed load.

The related hydraulic operation of rear suspension unit 7 is the same as the above, by which means the vehicle rear can be lowered. Thus the vehicle as a whole may be lowered and the driver may easily mount the vehicle.

Figure 15:
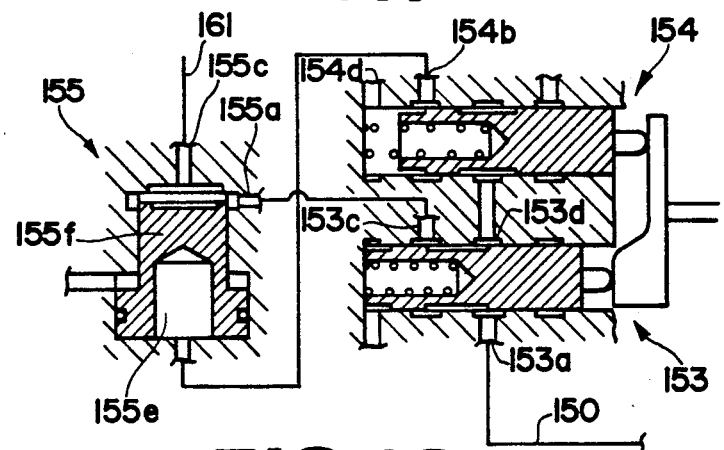

When the vehicle speed increased above 10 km/h, control motor 160 rotates, control valve 153 is in the ON condition, control valve 154 is in the OFF condition. As shown in FIG. 15, ports 153a, 153b, and 153c of valve 153 communicate as do ports 154b and 154d of valve 154. Accordingly, hydraulic pressure is not applied to hydraulic chamber 155e of servo valve 155 and piston 155f remains depressed. Therefore, oil is introduced at a fixed pressure to port 155a by oil conduit 150 through ports 153a and 153c of valve 153. This oil passes from port 155c through oil conduit 151 whereby it is sent to hydraulic chamber 52 of right front suspension unit 2, whereby accompanying the movement of its piston, a fixed load is applied to coil spring 13, and by means of its opposing force, the front end of the vehicle is caused to raise.

The related hydraulic operation of rear suspension unit 7 is the same as the above, by which means the vehicle rear can be raised. Thus the vehicle as a whole may be easily raised.

Figure 16:
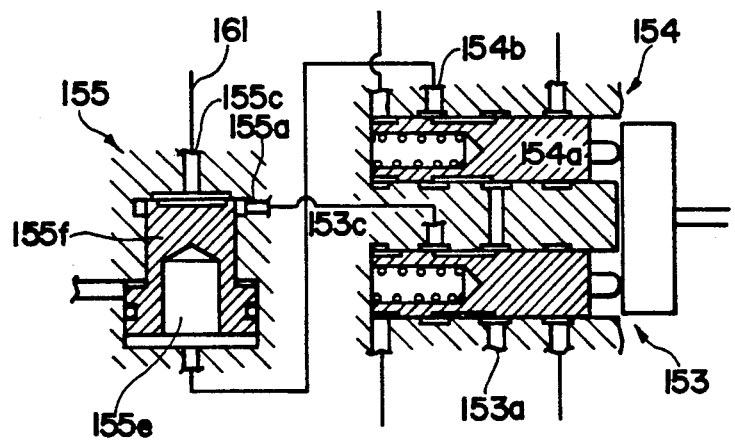

After completion of the above described operation, control motor 160 is rotating, and control valves 153 and 154 are both in the ON condition. As shown in FIG. 16, ports 153a and 153c of valve 153 communicate as do ports 154a and 154b of valve 154. Accordingly, hydraulic pressure is applied to hydraulic chamber 155e of servo valve 155 and the difference of the pressure applied to the surfaces of piston 155f on port 155c side and on port 155e side causes piston 155f to rise, whereby the communication between ports 155a and 155c is broken. By this effect, the oil pressure at the distal end of oil conduit 161 is maintained stable and the vehicle is maintained in a raised position.

When a decelerating vehicle goes below 10 km/h, control motor 160 is rotating, and control valves 153 and 154 are both in the OFF condition, just as shown in FIG. 14. Thus, ports 153c and 153e of valve 153 communicate as do ports 154b and 154d of valve 154. Accordingly, hydraulic pressure is not applied to hydraulic chamber 155e of servo valve 155 and piston 155f remains depressed and ports 153a and 153c therefore communicate. As a result, oil returns from hydraulic chamber 52 of right front suspension unit 2 through oil conduit 161, ports 155a and 155c of servo valve 153, ports 153c and 153e of control valve 153 to reserve tank 144b. By this effect, the front end of the vehicle lowers. The rear end of the vehicle similarly lowers.

Cylindrical cam 159 is constructed so that control valve 154 goes off first when control valves 153 and 154 move to the OFF position. Using the hydraulic pressure of hydraulic chamber 52 of right front suspension unit 2, piston 155f can be reliably moved to its lowered position.

Spring constant control of left front suspension unit 3 and rear suspension unit 7 is carried out by electrical signals from governing apparatus 10 which act on control motor 173. The function of the above mentioned cylindrical cam 174 which mediates this spring constant control is shown in Table 3 below.

TABLE 3

| | Spring Constant Preload Control | | | |
|---|---|---|---|---|
| | Valve 176 | Cam Position | Valve 175 | Cam Position |
| Start Engine | Off | Trough | Off | Trough |
| High Spring Constant | On | Crest | Off | Trough |
| Standard Spr Constant | On | Crest | On | Crest |
| Low Spring Constant | Off | Trough | Off | Trough |

Figure 21:
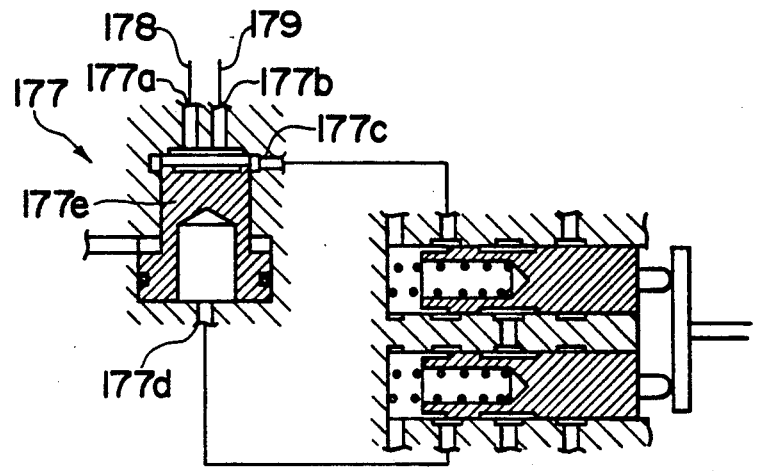
FIGS. 21, 22 and 23 are explanatory figures showing the operation of the hydraulic components of the adjustable spring constant mechanism of the second preferred embodiment of the present invention.

When the engine first starts, both contact points on cylindrical cam 174 are at crests, therefore, thus control valves 175 and 176 are both in the OFF condition. At this time, similar to FIG. 21, neither port 177c of 177d on servo valve 177 has hydraulic pressure applied. Piston 177e is retracted and ports 177a and 177b are connected to port 177c. In this condition, hydraulic chamber 91 on left front suspension unit 3 and hydraulic chamber 135 on rear suspension unit 7 have no oil pressure applied. Therefore, the spring constants are maintained in the low position.

Figure 22:
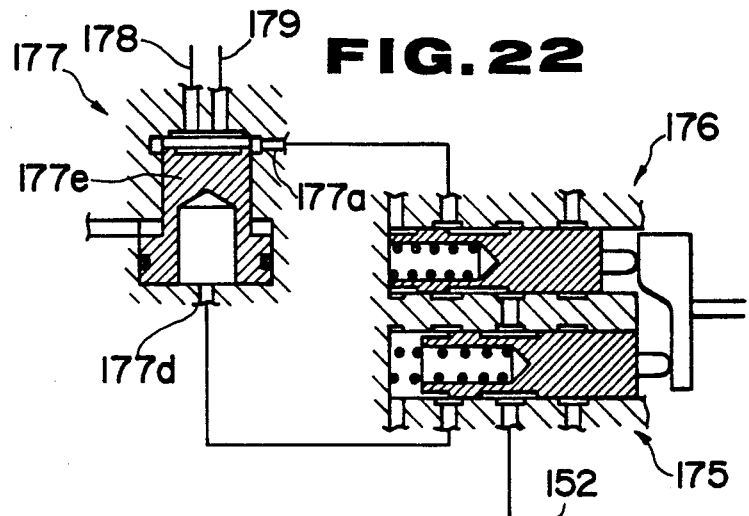

When, based on the signals from governing apparatus 10, control motor 173 is turning, control valve 175 is in the off condition, control valve 176 is in the on condition, as shown in FIG. 22, 177d on servo valve 177 is open to hydraulic and a fixed hydraulic pressure is applied to port 177c. Because piston 177e is retracted and ports 177a and 177b are connected to port 177c, fixed hydraulic pressure is transferred to hydraulic chamber 91 on left front suspension unit 3 as well as to hydraulic chamber 135 on rear suspension unit 7 via oil conduits 178 and 179. Thus, a fixed load is applied to springs 73 and 130 on left front suspension unit 3 and rear suspension unit 7, respectively, and the total spring constant is high.

Figure 23:
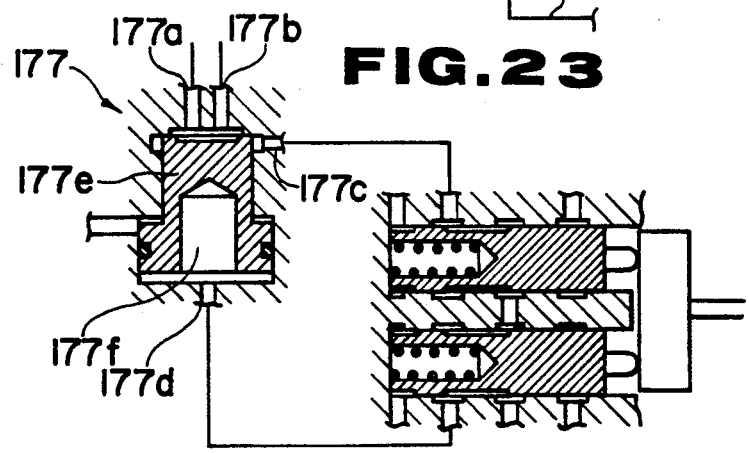

After completion of the above described operation, control motor 173 is rotating, and control valves 175 and 175 are both in the ON condition: As shown in FIG. 23, ports 177d and 177f provide hydraulic pressure to hydraulic chamber 177f. Thereby, piston 177e is extended whereby the communication between ports 177a, 177b, and 177c is broken. By this effect, oil is supplied from oil conduits 178 and 179 while maintaining a fixed pressure. Thus, it is possible to maintain a large spring constant on both left front suspension unit 3 and rear suspension unit 7.

Moreover, based on the signals from governing apparatus 10, control motor 173 is turning, control valves 175 and 176 are in the off condition (identical to FIG. 21), ports 177c and 177c on control valve 177 are not open to hydraulic pressure. Also, because piston 177e is retracted and ports 177a and 177b are connected to port 177c, the oil in hydraulic chamber 91 on left front suspension unit 3 as well as in hydraulic chamber 135 on rear suspension unit 7 is returned to reserve tank 144b via oil conduits 178 and 179 as well as by port 177c. For this reason, a fixed load is applied to springs 73 and 130 on left front suspension unit 3 and rear suspension unit 7, respectively, and the total spring constant becomes low.

GOVERNING APPARATUS

First Preferred Embodiment

In this section, a governing apparatus 10 for the first Preferred embodiment of the present invention will be described with reference to FIG. 3.

Governing apparatus 10 is a device which controls electric valves 148A, 148B, 148C, 150A, 150B, and 150C, and damping force adjustable motors 41, 59, 125 which control right front suspension unit 2, left front suspension unit 3, and rear suspension unit 7, respectively by means of electric signals.

More particularly, as shown in FIG. 2, connected to CPU 202 are G sensor $S_1$ which is fixed at the lower end of right front suspension unit 2, stroke sensor $S_2$ which detects contraction and extension of the front suspension, stroke sensor $S_3$ which picks up contraction and extension of rear suspension unit 7, other necessary sensors, mode selection switch $S_8$ for choosing the three modes of soft, medium, and hard, and encoders for damping force adjustable motors 41, 59, 125. The governing apparatus 10 electrically processes signals from these devices at CPU 202 so as to control the damping force adjustable motors and electric valves. In the figure, indicator 201 displays the setting of mode selection switch $S_8$.

Second Preferred Embodiment

In this section, a governing apparatus 10 for the second Preferred embodiment of the present invention will be described with reference to FIG. 13.

Figure 24:
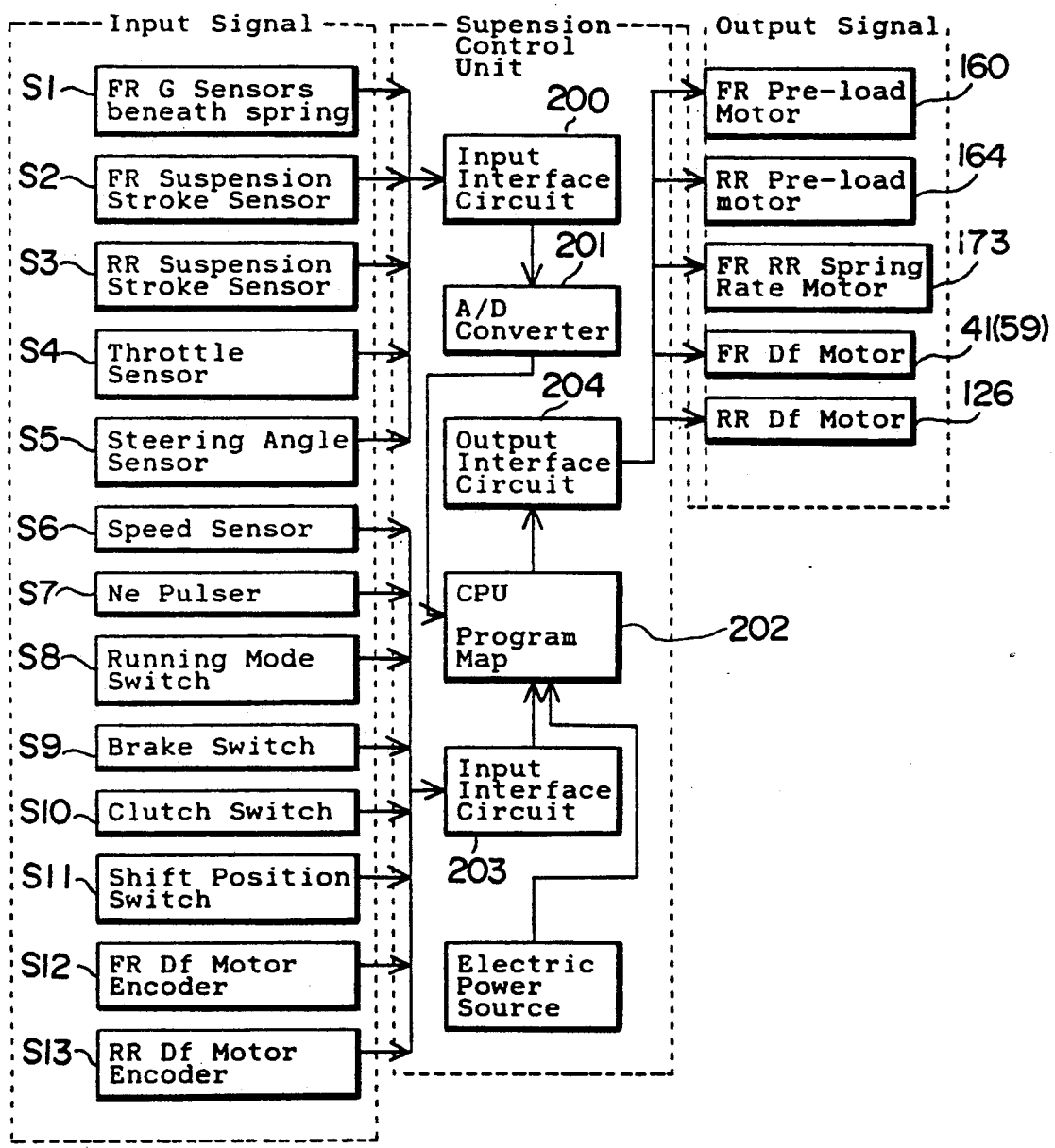
FIG. 24 is a flow diagram of the governing apparatus 10 of the second preferred embodiment of the present invention.
Figure 25:
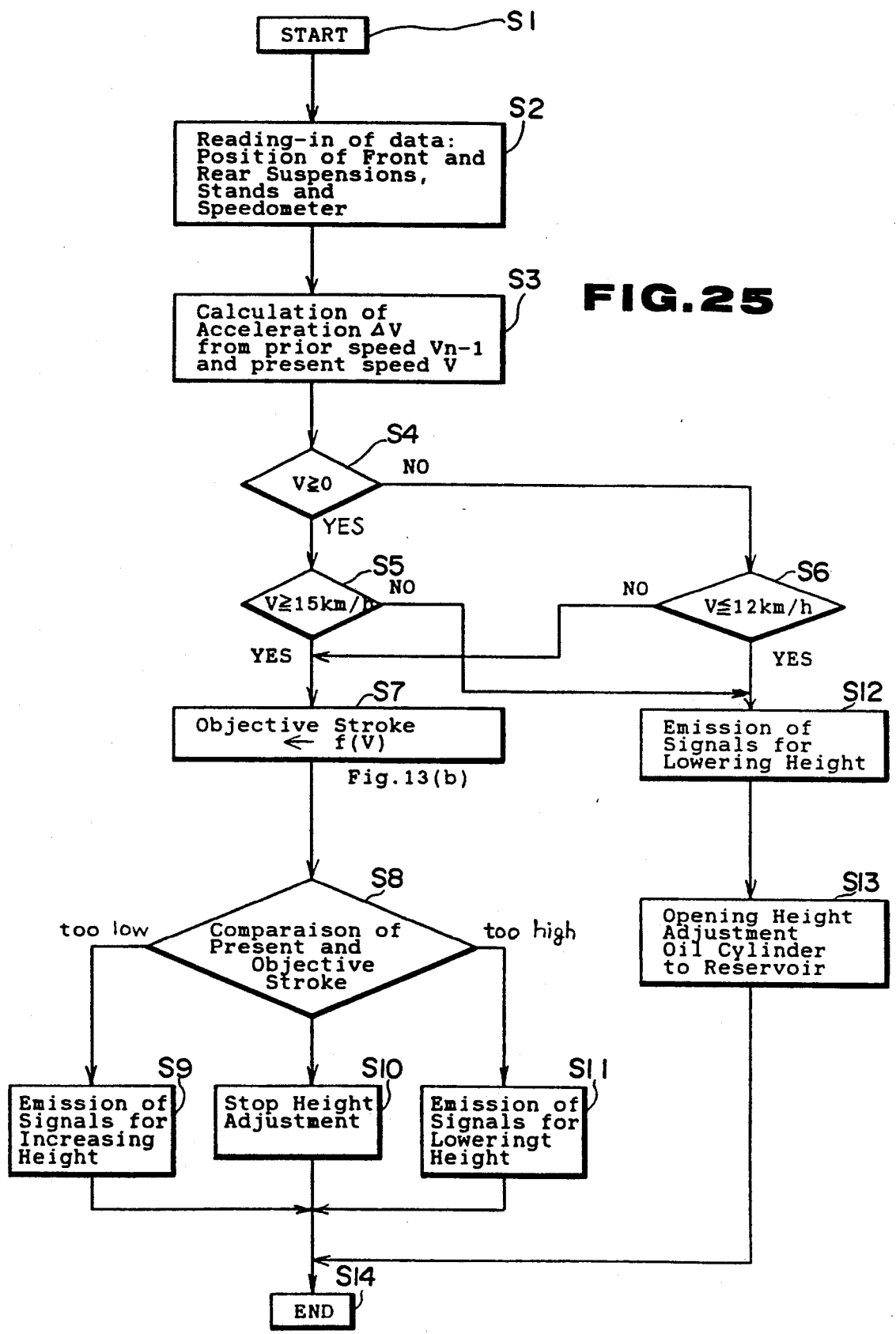
FIGS. 25, 26 and 27 are flow diagrams for explaining the reactions and responses of the suspension system of the second preferred embodiment of the present invention.
Figure 26:
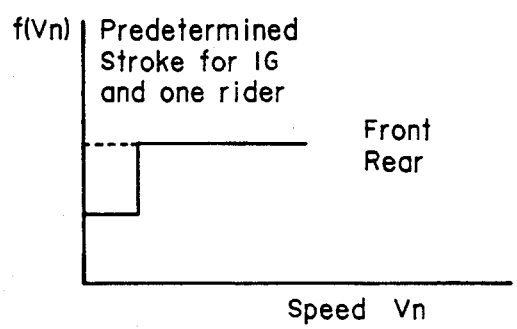
Figure 27:
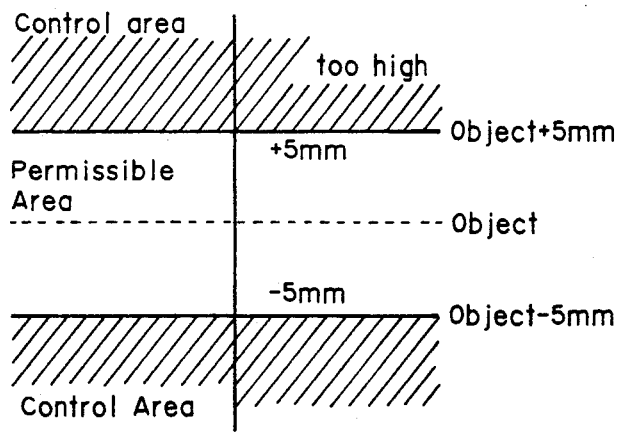
Figure 28:
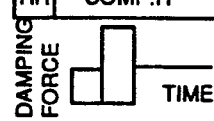

Governing apparatus 10 is a device which sends electrical signals to damping force adjustable motors 41, 59, 125 which control right front suspension unit 2, left front suspension unit 3, and rear suspension unit 7, respectively, as well as to the above described oil pressure managing unit 9. Essentially, as shown in FIG. 24, G sensor $S_1$ provided on the lower end of right front suspension unit 2; front suspension stroke sensor $S_2$; stroke sensor $S_3$ on rear suspension unit 7; throttle sensor $S_4$ incorporated in the carburetor throttle valves and the like; and steering position sensor $S_5$ are provided. These respective sensors input electric signals to input interface circuit 200, and thence to A/D converter 201 and CPU 202.

Similarly, velocity sensor $S_6$; engine RPM sensor $S_7$; soft, medium, and hard, three position riding condition mode switch $S_8$; brake switch $S_9$; clutch switch $S_{10}$; shift position switch $S_{11}$; an encoder switch $S_{12}$ for front suspension damping force change motors 41, 59; and an encoder switch $S_{13}$ for rear suspension damping force change motor 125 are provided, their action converted to electrical signals and sent to input interface circuit 203, and thence to CPU 202. Based on an imbedded program, the above mentioned various signals input to CPU 202 are processed and output to output interface circuit 204. From the above mentioned output interface circuit 204, respective signals are sent to the length governing preload control motor 160 on right front suspension unit 2; length governing preload control motor 164 on rear suspension unit 7; spring constant controlling control motor 173 the spring constant selectors provided on left front suspension unit 3 and rear suspension unit 7; and damping force control motors 41, 59, 125. The above mentioned damping force control motors 41, 59, 125 provide feedback. In the following, the individual control functions will be described in detail.

ACTION OF THE SUSPENSION SYSTEM

This present invention, in particular action of the suspension system, will be described with reference to FIGS. 17, 18, 19, 20, 25, 26, 27, and 28. In the figures, FR means "front" and RR means "rear". In FIGS. 19 and 20, the circle means that the control element is controlled. The dash means that the control element is not controlled. The dotted circle means that the control element can be controlled optionally.

Mode Selection

This device allows the rider to choose the suspension characteristics from the three choices of soft, medium, and hard. Selection will be done by moving mode selection switch $s_8$ manually. Factors contributing to the control are the damping force and spring constant of the front and rear suspension units.

Height Adjustment

The objectives of this adjustment are to secure ease of maneuvering at very low speeds as well as allowing the rider to reach the ground with his or her feet with ease. When the vehicle is at a stop, preload is not applied and the vehicle is kept at a low position. When the vehicle speed reaches a certain level, for example 15 km/h, the height is lowered by some 20 mm.

Height adjustment is also operated based on loading conditions. For example, when two people or heavy cargo is present, stroke sensor $S_2$ and stroke sensor $S_3$ will detect the height of the vehicle. If the height is judged to be too low, the vehicle height will be raised. This adjustment is also performed when the vehicle speed reaches 15 km/h or more.

The following is a detailed description of the governing apparatus 10 with reference to FIGS. 14(a), (b), and (c).

Steps 1 and 2

The governing apparatus 10 is activated and the stroke position of the front and rear suspension units and the vehicle speed $V_n$ are read in from stroke sensors $S_2$, and $S_3$, and velocity sensor $s_6$ respectively.

Steps 3 and 4

Acceleration $\Delta V$ is calculated from the previous speed $V_n-1$ and the present vehicle speed $V_n$ and judgement is made as to whether the value is greater than, less than, or equal to zero, in other words, if the vehicle is accelerated, decelerated, or at a constant speed. If the vehicle is accelerating or at a constant speed, then governing apparatus 10 jumps to Step 5. If the vehicle is decelerating, then governing apparatus 10 jumps to Step 6.

Step 5

In this step, the vehicle speed is determined in order to ascertain whether it is moving at a slow speed, for example less than 15 km/h, or a normal speed, i.e. greater than 15 km/h. If the vehicle is judged to be moving at a slow speed, then governing apparatus 10 jumps to Step 7.

Step 6

Speed judgment is carried out in this present Step and the above Step 5 so that the vehicle may be lowered when it is determined to be stopped or running at a very low speed. For lowering speed criteria, 15 km/hr is desirable when the vehicle is accelerating or running at a constant speed, and 12 hm/h when the vehicle is decelerating based on the properties of the overall suspension system.

Step 7

As shown in FIG. 15, in Step 7, the target stroke of the front and rear suspension units is determined for the present vehicle speed $V_n$.

The front suspension stroke is set longer and the rear suspension stroke is set shorter when the vehicle speed exceeds a certain point because the front of the vehicle tends to raise and the rear tends to depress due to lift applied to the vehicle as it increases its speed. By this means, optimum load can be applied to the front and rear wheels.

Steps 8, 9, 10, and 11

In Step 8, a comparison is made between the actual suspension stroke and the target stroke. If the target stroke is greater than 5 mm than the suspension stroke, then governing apparatus 10 jumps to Step 9. If the suspension stroke is greater than 5 mm than the target stroke, it jumps to step 10. If the target stroke and the suspension stroke are within 5 mm of each other, then governing apparatus 10 jumps to Step 11. Appropriate signals are then sent to electric valves 148A, 148B, 148C, 150A, 150B, and 150C. The position of the vehicle support stand is also determined in the present steps.

Steps 12, and 13

Appropriate signals are sent to electric valve 150A so that hydraulic chambers 52 and 110, which are installed in cylinders 51 and 109 of right front suspension unit 2 and rear suspension unit 7 will be opened. After the two hydraulic chambers are opened, pre-load adjuster pistons 16 and 108 withdraw until they touch stoppers 50a and 109a so as to lower the vehicle.

After completing these steps, governing apparatus 10 jumps to Step 14.

Attitude Control

The objective of attitude control is to prevent excessive dipping of the front of the vehicle when it descends a slope, or the rear of the vehicle when it is climbing a slope, thereby improving maneuverability.

For instance, if the vehicle runs at over 15 km/h and the rear is maintained in a low position for a certain period of time, the height adjustment system will start to operate and raise the rear part of the vehicle. Similarly, if the vehicle descends a slope under specific conditions, the height adjustment system of the front suspension will lift the front part of the vehicle. At the same time, anti-squat and anti-dive control are performed.

Anti-Squat Control

This control is aimed at securing safe attitude of the vehicle when quick acceleration is applied. Quick acceleration is judged to have occurred when the opening of the throttle exceeds a specified value in relation to the vehicle speed when the power transmission system is in operation. In such a case, the damping force property of the front suspension system will subsequently be set at hard mode in the extension phase while the rear suspension system will be set at hard mode in the contraction phase. This is because the front of the vehicle will rise while the rear will fall during rapid acceleration. Since rapid acceleration in not ordinarily of long duration, after one second, the suspension system is returned to its pre-acceleration condition.

Anti-Dive Control

This control is aimed at securing safe attitude of the vehicle when quick deceleration takes place due to throttle control. It is in general, an opposite set of actions to those described above for anti-squat control. Quick deceleration is judged to have occurred when the closing of the throttle exceeds a specified value in relation to the vehicle speed when the power transmission system is in operation. In such a case, the damping force property of the front suspension system will subsequently be set at hard mode in the contraction phase while the rear suspension system will be set at hard mode in the extension phase. This is because the front of the vehicle will dive during rapid deceleration. As with the anti-squat control, the suspension system is returned to its pre-acceleration condition after one second.

Pitching Control

This control is aimed at securing safe attitude of the vehicle when rapid acceleration or deceleration takes place. When rapid deceleration by braking occurs as detected by brake sensor $S_9$, the rear suspension system will subsequently be set at hard mode in the contraction phase. This serves to prevent the front of the vehicle from diving. As above, this control lasts for one second.

When the speed of the drive shaft on the engine side and that of the wheel side are widely disparate, a shock will occur when the clutch is engaged. Additional controls are also carried out to ease this impact during both acceleration and deceleration.

Condition Control

This control is aimed at securing safety during high speed operation and when obstacles are encountered on the road. If the vehicle exceeds a certain speed, for example 130 km/h, the suspension system will automatically be shifted to a harder mode because a harder suspension system provides easier riding and increased safety at high speed.

If the front wheel impacts an obstacle on the road, the G sensor $S_1$ will detect it and the rear suspension will be shifted to "ultra soft" mode by the signal from the sensor. Thus, the jumping of the rear of the vehicle can be avoided when it also strikes the obstacle. At very high speeds, for example greater than 130 hm/h, this maneuver is not effective and is therefore not carried out.

In some cases, the above described controls may contradict with each other. Respective priority controls for the various controls are thus provided. Although only hydraulic control systems are described in the present preferred embodiment, pneumatic controls may be employed as well.

As described in the previous sections, the present invention concerns a suspension system and method for adjusting the height of two-wheeled motor vehicles by mounting hydraulic cylinders in the suspension units and forcefully changing the length of the suspension units by applying hydraulic fluid.

The operating sequence of the present invention is characterized in that the control fluid is released from the cylinders when the vehicle is at a stop or moving at a very slow speed, and that the travel of the pistons interior to the cylinders is limited by stoppers which are preset to lower the vehicle to a desired height. Thus, the present invention does not require fine control in order to maintain the height to which the vehicle is lowered when at a stop or moving at a very slow speed. Simplification of the associated control circuitry and hence reliability is thereby achieved.

What is claimed is:

1. A method for controlling the suspension of a two-wheeled motor vehicle having a front suspension, a rear suspension and a brake, the front and rear suspensions each having a height adjustable function, comprising the steps of
   repeatedly sensing the speed of the vehicle;
   calculating acceleration of the vehicle from the repeated steps of sensing the speed of the vehicle;
   comparing the speed of the vehicle with a preselected first value and a preselected second value, said first value being larger than said second value;
   selecting the preselected first value as a standard value when acceleration is positive or zero and the preselected second value when the acceleration is negative;
   lowering the front suspension and the rear suspension when the speed of the vehicle is below the selected standard value.

2. The method of claim 1 further including the step of raising the front suspension and the rear suspension when the sensed position of the front suspension and the rear suspension are below preselected values regardless of the speed of the vehicle.

3. The method of claim 1 further including the steps of
   sensing the throttle opening;
   setting the front suspension at hard when sensing the front suspension as raised and when sensing the throttle opening as exceeding a preselected value in relation to the sensed vehicle speed;
   setting the rear suspension at hard when sensing the rear suspension as lowered and when sensing the throttle opening as exceeding a preselected value in relation to the sensed vehicle speed.

4. The method of claim 3 further including the step of returning the suspension system to the pre-acceleration condition after one second of sensing the throttle opening as exceeding the preselected value in relation to the sensed vehicle speed.

5. The method of claim 1 further including the step of sensing the throttle opening;
   setting the front suspension at hard when sensing the front suspension as lowered when the throttle opening is sensed as below a first preselected value in relation to the sensed vehicle speed;
   setting the rear suspension damping characteristic at hard when sensing the rear suspension as raised when the throttle opening is sensed as below said preselected value in relation to the sensed vehicle speed.

6. The method of claim 5 further including the step of returning the suspension system to the pre-deceleration condition after one second of sensing the throttle opening as below said preselected value in relation to the sensed vehicle speed.

7. The method of claim 1 further including the step of sensing the application of the brake;
   setting the rear suspension at hard upon sensing application of the brakes when sensing the rear suspension as lowered.

8. The method of claim 1 further including the step of setting the front suspension and the rear suspension at hard upon sensing the speed of the vehicle as above a second preselected value.

9. The method of claim 1 further including the steps of
   sensing rapid acceleration of a front wheel of the vehicle when hitting an obstacle;
   setting the rear suspension at soft upon sensing the rapid acceleration.

10. The method of claim 9 further including the step of disabling the step of setting the rear suspension at soft when the speed of the vehicle is sensed at above a second predetermined speed.

11. A method for controlling the suspension of a two-wheeled motor vehicle having a front suspension, a rear suspension and a brake, the front and rear suspensions each having a height adjustable function, comprising the steps of
   repeatedly sensing the speed of the vehicle;
   sensing the position of the front suspension;
   calculating acceleration of the vehicle from the repeated steps of sensing the speed of the vehicle;
   sensing the throttle opening;
   setting the front suspension at hard when sensing the front suspension as lowered and when sensing the throttle opening as below a preselected value in relation to the sensed vehicle speed;
   comparing the speed of the vehicle with a preselected first value and a preselected second value, said first value being larger than said second value;
   selecting the preselected first value as a standard value when acceleration is positive or zero and the preselected second value when the acceleration is negative;
   lowering the front suspension and the rear suspension when the speed of the vehicle is below the selected standard value.

* * * * *